US011803174B2

(12) United States Patent
Elbsat et al.

(10) Patent No.: US 11,803,174 B2
(45) Date of Patent: Oct. 31, 2023

(54) BUILDING MANAGEMENT SYSTEM FOR FORECASTING TIME SERIES VALUES OF BUILDING VARIABLES

(71) Applicant: Johnson Controls Technology Company, Holland, MI (US)

(72) Inventors: Mohammad N. Elbsat, Milwaukee, WI (US); Michael J. Wenzel, Grafton, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 963 days.

(21) Appl. No.: 14/717,593

(22) Filed: May 20, 2015

(65) Prior Publication Data

US 2015/0316907 A1    Nov. 5, 2015

Related U.S. Application Data

(63) Continuation-in-part of application No. 14/634,609, filed on Feb. 27, 2015, now Pat. No. 10,175,681.

(Continued)

(51) Int. Cl.
*G06N 20/00* (2019.01)
*G05B 13/04* (2006.01)
(Continued)

(52) U.S. Cl.
CPC ......... *G05B 19/418* (2013.01); *G05B 13/048* (2013.01); *G05B 15/02* (2013.01);
(Continued)

(58) Field of Classification Search
CPC .. G05B 19/418; G05B 13/021; G05B 13/048; G05B 15/02; G05F 1/66; G06N 20/00; G06Q 10/04; G06Q 10/06; G06Q 50/06
See application file for complete search history.

(56) References Cited

U.S. PATENT DOCUMENTS 4,349,869 A   9/1982 Prett et al.
4,616,308 A   10/1986 Morshedi et al.
(Continued)

FOREIGN PATENT DOCUMENTS

CA   2957726 A1   3/2016
CA   3043996 A1   2/2018
(Continued)

OTHER PUBLICATIONS

Oldewurtel, Frauke ta l. "Energy Efficient Building Climate Control using Stochastic MOdel Predictive Control and Weather Predictions" 2010 [Online] Downloaded Jan. 9, 2020 https://ieeexplore.ieee.org/stamp/stamp.jsp?tp=&arnumber=5530680&tag=1 (Year: 2010).*

(Continued)

*Primary Examiner* — Ben M Rifkin
(74) *Attorney, Agent, or Firm* — Foley & Lardner LLP

(57) ABSTRACT

A building management system (BMS) includes sensors that measure time series values of building variables and a deterministic model generator that uses historical values for the time series of building variables to train a deterministic model that predicts deterministic values for the time series. The BMS includes a stochastic model generator that uses differences between actual values for the time series and the predicted deterministic values to train a stochastic model that predicts a stochastic value for the time series. The BMS includes a forecast adjuster that adjusts the predicted deterministic values using the predicted stochastic value to generate an adjusted forecast for the time series. The BMS includes a demand response optimizer that uses the adjusted forecast to generate an optimal set of control actions for building equipment of the BMS. The building equipment operate to affect the building variables.

19 Claims, 11 Drawing Sheets

Related U.S. Application Data

(60) Provisional application No. 61/987,361, filed on May 1, 2014.

(51) Int. Cl.

| | | |
|---|---|---|
| *G05B 19/418* | (2006.01) | |
| *G05B 15/02* | (2006.01) | |
| *G06Q 10/04* | (2023.01) | |
| *G06Q 10/06* | (2023.01) | |
| *G06Q 50/06* | (2012.01) | |

(52) U.S. Cl.
CPC .............. *G06N 20/00* (2019.01); *G06Q 10/04* (2013.01); *G06Q 10/06* (2013.01); *G06Q 50/06* (2013.01); *G05B 2219/2639* (2013.01); *G05B 2219/2642* (2013.01); *G05B 2219/31414* (2013.01); *G05B 2219/32021* (2013.01); *Y02P 70/10* (2015.11); *Y02P 80/10* (2015.11)

(56) References Cited

U.S. PATENT DOCUMENTS

| | | | |
|---|---|---|---|
| 5,301,101 A | | 4/1994 | MacArthur et al. |
| 5,347,446 A | | 9/1994 | Iino et al. |
| 5,351,184 A | | 9/1994 | Lu et al. |
| 5,408,406 A | | 4/1995 | Mathur et al. |
| 5,442,544 A | | 8/1995 | Jelinek |
| 5,519,605 A | | 5/1996 | Cawlfield |
| 5,572,420 A | | 11/1996 | Lu |
| 5,579,993 A | * | 12/1996 | Ahmed ................ F24F 11/0009 236/49.3 |
| 5,778,059 A | * | 7/1998 | Loghmani .......... H04Q 3/54583 379/207.02 |
| 5,924,486 A | * | 7/1999 | Ehlers ................ G05D 23/1923 165/238 |
| 5,963,458 A | | 10/1999 | Cascia |
| 6,055,483 A | | 4/2000 | Lu |
| 6,122,555 A | | 9/2000 | Lu |
| 6,278,899 B1 | | 8/2001 | Piche et al. |
| 6,347,254 B1 | | 2/2002 | Lu |
| 6,459,939 B1 | | 10/2002 | Hugo |
| 6,807,510 B1 | | 10/2004 | Backstrom et al. |
| 7,050,863 B2 | | 5/2006 | Mehta et al. |
| 7,050,866 B2 | | 5/2006 | Martin et al. |
| 7,113,890 B2 | | 9/2006 | Frerichs et al. |
| 7,152,023 B2 | | 12/2006 | Das |
| 7,165,399 B2 | | 1/2007 | Stewart |
| 7,188,779 B2 | | 3/2007 | Alles |
| 7,197,485 B2 | | 3/2007 | Fuller |
| 7,203,554 B2 | | 4/2007 | Fuller |
| 7,266,416 B2 | | 9/2007 | Gallestey et al. |
| 7,272,454 B2 | | 9/2007 | Wojsznis et al. |
| 7,275,374 B2 | | 10/2007 | Stewart et al. |
| 7,328,074 B2 | | 2/2008 | Das et al. |
| 7,328,577 B2 | | 2/2008 | Stewart et al. |
| 7,376,471 B2 | | 5/2008 | Das et al. |
| 7,376,472 B2 | | 5/2008 | Wojsznis et al. |
| 7,389,773 B2 | | 6/2008 | Stewart et al. |
| 7,400,933 B2 | | 7/2008 | Rawlings et al. |
| 7,418,372 B2 | | 8/2008 | Nishira et al. |
| 7,424,409 B2 | * | 9/2008 | Ben-Gal ................ G06Q 40/04 341/107 |
| 7,454,253 B2 | | 11/2008 | Fan |
| 7,496,413 B2 | | 2/2009 | Fan et al. |
| 7,577,483 B2 | | 8/2009 | Fan et al. |
| 7,591,135 B2 | | 9/2009 | Stewart |
| 7,610,108 B2 | | 10/2009 | Boe et al. |
| 7,650,195 B2 | | 1/2010 | Fan et al. |
| 7,664,573 B2 | | 2/2010 | Ahmed |
| 7,676,283 B2 | | 3/2010 | Liepold et al. |
| 7,826,909 B2 | | 11/2010 | Attarwala |
| 7,827,813 B2 | | 11/2010 | Seem |
| 7,844,352 B2 | | 11/2010 | Vouzis et al. |
| 7,856,281 B2 | | 12/2010 | Thiele et al. |
| 7,873,441 B2 | | 1/2011 | Synesiou et al. |
| 7,878,178 B2 | | 2/2011 | Stewart et al. |
| 7,894,943 B2 | | 2/2011 | Sloup et al. |
| 7,930,045 B2 | | 4/2011 | Cheng |
| 7,945,352 B2 | | 5/2011 | Koc |
| 7,949,416 B2 | | 5/2011 | Fuller |
| 7,987,145 B2 | | 7/2011 | Baramov |
| 7,996,140 B2 | | 8/2011 | Stewart et al. |
| 8,005,575 B2 | | 8/2011 | Kirchhof |
| 8,032,235 B2 | | 10/2011 | Sayyar-Rodsari |
| 8,036,758 B2 | | 10/2011 | Lu et al. |
| 8,046,089 B2 | | 10/2011 | Renfro et al. |
| 8,060,258 B2 | | 11/2011 | Butoyi |
| 8,060,290 B2 | | 11/2011 | Stewart et al. |
| 8,073,659 B2 | | 12/2011 | Gugaliya et al. |
| 8,078,291 B2 | | 12/2011 | Pekar et al. |
| 8,096,140 B2 | | 1/2012 | Seem |
| 8,105,029 B2 | | 1/2012 | Egedal et al. |
| 8,109,255 B2 | | 2/2012 | Stewart et al. |
| 8,121,818 B2 | | 2/2012 | Gorinevsky |
| 8,126,575 B2 | | 2/2012 | Attarwala |
| 8,145,329 B2 | | 3/2012 | Pekar et al. |
| 8,180,493 B1 | | 5/2012 | Laskow |
| 8,185,217 B2 | | 5/2012 | Thiele |
| 8,200,346 B2 | | 6/2012 | Thiele |
| 8,219,250 B2 | | 7/2012 | Dempster et al. |
| 8,275,483 B2 | | 9/2012 | Higgins |
| 8,291,720 B2 | | 10/2012 | Hartman |
| 8,412,381 B2 | | 4/2013 | Nikovski et al. |
| 8,417,392 B2 | | 4/2013 | Higgins |
| 8,495,888 B2 | | 7/2013 | Seem |
| 8,600,561 B1 | | 12/2013 | Modi et al. |
| 8,660,704 B2 | | 2/2014 | Higgins |
| 8,774,978 B2 | | 7/2014 | Higgins et al. |
| 8,818,563 B2 | | 8/2014 | Gwerder et al. |
| 8,843,238 B2 | | 9/2014 | Wenzel et al. |
| 8,897,921 B2 | | 11/2014 | Dempster et al. |
| 8,903,554 B2 | | 12/2014 | Stagner |
| 8,930,030 B2 | | 1/2015 | Bester et al. |
| 9,002,532 B2 | | 4/2015 | Asmus |
| 9,235,657 B1 | | 1/2016 | Wenzel et al. |
| 9,285,135 B2 | | 3/2016 | Gao et al. |
| 9,367,053 B2 | | 6/2016 | Kuhlmann et al. |
| 9,429,921 B2 | | 8/2016 | Lu et al. |
| 9,436,179 B1 | | 9/2016 | Turney et al. |
| 9,447,985 B2 | | 9/2016 | Johnson |
| 9,535,411 B2 | | 1/2017 | Wei et al. |
| 9,546,795 B2 | | 1/2017 | Pienta et al. |
| 9,679,248 B2 | * | 6/2017 | Lecue .................... G06N 5/025 |
| 9,709,966 B2 | | 7/2017 | Chandan et al. |
| 9,746,199 B1 | * | 8/2017 | Drees .................... F24F 11/053 |
| 9,746,213 B2 | | 8/2017 | Warren |
| 9,746,228 B2 | | 8/2017 | Sibik |
| 9,817,383 B1 | * | 11/2017 | Sinha .................. G05B 19/048 |
| 9,852,481 B1 | | 12/2017 | Turney et al. |
| 9,892,472 B2 | | 2/2018 | Ji et al. |
| 9,915,178 B2 | | 3/2018 | Sun et al. |
| 9,957,970 B2 | | 5/2018 | Tateishi et al. |
| 9,967,107 B2 | | 5/2018 | Jones et al. |
| 9,973,129 B2 | | 5/2018 | Schuster et al. |
| 9,989,943 B2 | | 6/2018 | Clanin et al. |
| 9,995,509 B2 | | 6/2018 | Cline |
| 10,077,915 B2 | | 9/2018 | Lu et al. |
| 10,101,731 B2 | | 10/2018 | Asmus et al. |
| 10,871,756 B2 | | 12/2020 | Johnson et al. |
| 10,908,578 B2 | | 2/2021 | Johnson et al. |
| 10,921,768 B2 | | 2/2021 | Johnson et al. |
| 11,156,978 B2 | | 10/2021 | Johnson et al. |
| 2003/0033587 A1 | * | 2/2003 | Ferguson ............... G06Q 10/04 717/104 |
| 2004/0225649 A1 | * | 11/2004 | Yeo ........................ G01D 4/004 |
| 2005/0240427 A1 | | 10/2005 | Crichlow |
| 2006/0065750 A1 | | 3/2006 | Fairless |
| 2007/0005191 A1 | * | 1/2007 | Sloup .................... G05B 13/041 700/276 |
| 2009/0062969 A1 | | 3/2009 | Chandra et al. |
| 2009/0313083 A1 | | 12/2009 | Dillon et al. |
| 2009/0319090 A1 | | 12/2009 | Dillon et al. |
| 2010/0087933 A1 | | 4/2010 | Cheng |

(56) References Cited

U.S. PATENT DOCUMENTS

| | | |
|---|---|---|
| 2010/0235004 A1 | 9/2010 | Thind |
| 2010/0269854 A1 | 10/2010 | Barbieri et al. |
| 2011/0022193 A1 | 1/2011 | Panaitescu |
| 2011/0060424 A1 | 3/2011 | Havlena |
| 2011/0061015 A1* | 3/2011 | Drees .................. G05B 15/02 715/771 |
| 2011/0066258 A1 | 3/2011 | Torzhkov et al. |
| 2011/0066298 A1 | 3/2011 | Francino et al. |
| 2011/0080548 A1 | 4/2011 | Sonoda et al. |
| 2011/0088000 A1 | 4/2011 | Mackay |
| 2011/0125293 A1 | 5/2011 | Havlena |
| 2011/0153103 A1* | 6/2011 | Brown .................. G06Q 10/04 700/291 |
| 2011/0257789 A1 | 10/2011 | Stewart et al. |
| 2011/0301723 A1 | 12/2011 | Pekar et al. |
| 2012/0010757 A1 | 1/2012 | Francino et al. |
| 2012/0010758 A1 | 1/2012 | Francino et al. |
| 2012/0059351 A1 | 3/2012 | Nordh |
| 2012/0060505 A1 | 3/2012 | Fuller et al. |
| 2012/0109620 A1 | 5/2012 | Gaikwad et al. |
| 2012/0116546 A1 | 5/2012 | Sayyar-Rodsari |
| 2012/0185728 A1* | 7/2012 | Guo .................... F24F 11/0009 714/26 |
| 2012/0259469 A1 | 10/2012 | Ward et al. |
| 2012/0290230 A1* | 11/2012 | Berges Gonzalez ... G01D 4/004 702/61 |
| 2012/0308988 A1* | 12/2012 | Discenzo ............... C12M 41/36 435/3 |
| 2012/0316914 A1 | 12/2012 | Lee et al. |
| 2013/0003543 A1* | 1/2013 | Ludwig .................. H04L 47/78 370/230 |
| 2013/0006439 A1 | 1/2013 | Selvaraj |
| 2013/0013121 A1 | 1/2013 | Henze et al. |
| 2013/0125565 A1 | 5/2013 | Erpelding et al. |
| 2013/0144451 A1 | 6/2013 | Kumar et al. |
| 2013/0178993 A1 | 7/2013 | Rombouts et al. |
| 2013/0179373 A1 | 7/2013 | Mutchnik et al. |
| 2013/0262654 A1 | 10/2013 | Masli et al. |
| 2013/0345880 A1 | 12/2013 | Asmus |
| 2014/0032255 A1 | 1/2014 | Hegazi |
| 2014/0039965 A1 | 2/2014 | Steven et al. |
| 2014/0049545 A1 | 2/2014 | Losee et al. |
| 2014/0216685 A1 | 8/2014 | Bicknell |
| 2014/0257907 A1 | 9/2014 | Chen et al. |
| 2014/0266682 A1* | 9/2014 | Gettings ................ G08B 23/00 340/517 |
| 2014/0358508 A1 | 12/2014 | Raghunathan et al. |
| 2014/0379139 A1 | 12/2014 | Dempster |
| 2015/0134135 A1* | 5/2015 | Wong .................. H02J 3/38 700/295 |
| 2015/0185716 A1 | 7/2015 | Wichmann et al. |
| 2015/0198345 A1 | 7/2015 | Bicknell |
| 2015/0316903 A1 | 11/2015 | Asmus et al. |
| 2015/0316907 A1* | 11/2015 | Elbsat .................. G06Q 10/04 700/275 |
| 2015/0370271 A1 | 12/2015 | Raghunathan et al. |
| 2016/0004798 A1 | 1/2016 | Crawford et al. |
| 2016/0061469 A1 | 3/2016 | Aldonesi et al. |
| 2016/0246269 A1 | 8/2016 | Ahmed et al. |
| 2016/0283844 A1 | 9/2016 | Jones et al. |
| 2017/0045257 A1 | 2/2017 | Moffitt |
| 2017/0052536 A1 | 2/2017 | Warner et al. |
| 2017/0179716 A1 | 6/2017 | Vitullo |
| 2017/0198933 A1 | 7/2017 | Erpelding et al. |
| 2017/0241661 A1 | 8/2017 | Erpelding et al. |
| 2017/0256987 A1 | 9/2017 | Buchstaller et al. |
| 2017/0315580 A1 | 11/2017 | Dempster |
| 2017/0343267 A1 | 11/2017 | Erpelding et al. |
| 2018/0113482 A1 | 4/2018 | Vitullo |

FOREIGN PATENT DOCUMENTS

| | | |
|---|---|---|
| CN | 201297253 Y | 8/2009 |
| CN | 201297257 Y | 8/2009 |
| CN | 101900448 A | 12/2010 |
| CN | 201837139 U | 5/2011 |
| CN | 102331758 A | 1/2012 |
| CN | 102331759 A | 1/2012 |
| CN | 102893227 A | 1/2013 |
| CN | 203464552 U | 3/2014 |
| CN | 204678489 | 9/2015 |
| CN | 106500274 A | 3/2017 |
| CN | 106940075 A | 7/2017 |
| CN | 107238180 A | 10/2017 |
| CN | 106640655 B | 12/2017 |
| CN | 107525319 | 12/2017 |
| CN | 108317588 A | 7/2018 |
| EP | 2 686 937 B1 | 1/2014 |
| EP | 3 186 687 A4 | 7/2017 |
| EP | 3 497 377 A1 | 6/2019 |
| JP | 2016-061487 | 4/2016 |
| JP | 2019-049931 | 3/2019 |
| KR | 1548136 B1 | 8/2015 |
| KR | 101548136 | 9/2015 |
| WO | WO-2011/072332 A1 | 6/2011 |
| WO | WO-2011/080547 A1 | 7/2011 |
| WO | WO-2011/080548 | 7/2011 |
| WO | WO 2011080548 A1 * | 7/2011 | ............. G06Q 10/06 |
| WO | WO 2014043623 A1 * | 3/2014 | ............. G06F 11/008 |
| WO | WO-2014/124353 | 8/2014 |
| WO | WO-2014/153552 A1 | 9/2014 |
| WO | WO-2015/077754 | 5/2015 |
| WO | WO-2015/174176 | 11/2015 |
| WO | WO-2018/132770 A1 | 1/2017 |
| WO | WO-2017/084371 | 5/2017 |

OTHER PUBLICATIONS

Oldewurtel, Frauke (Oldewurtel-2) et al. "Use of model predictive control and weather forecasts for energy efficient building climate control" 2012 [Online] Downloaded Dec. 2, 2020 https://www.sciencedirect.com/science/article/pii/S0378778811004105 (Year: 2012).*

Leith, C. E. "OBjective Methods for Weather Prediction" 1978 [Online] Downloaded Dec. 2, 2020 https://www.annualreviews.org/doi/pdf/10.1146/annurev.fl.10.010178.000543 (Year: 1978).*

Klitin, O. A. "Stochastic Load Flows" IEEE 1975 [Online] Downloaded Apr. 20, 2021 https://ieeexplore.ieee.org/stamp/stamp.jsp?tp=&arnumber=1601457&tag=1 (Year: 1975).*

Extended European Search Report for EP Application No. 16154938. 1, dated Jun. 23, 2016, 8 pages.

Extended European Search Report for EP Application No. 16154940. 7, dated Jun. 30, 2016, 7 pages.

Deng et al., Optimal Scheduling of Chiller Plant with Thermal Energy Storage using Mixed Integer Linear Programming, Jun. 17-19, 2013, American Control Conference (ACC) 2013, 6 pages.

Gunter et al., Optimal Design of Grid-Connected PEV Charging Systems With Intgrated Distributed Resources, IEEE Transactions on Smart Grid 4, No. 2 (n.d.): 956-967, 13 pages.

Zakeri et al., Optimization of Demand Response Through Peak Shaving, Oct. 25, 2013, 9 pages.

Examination Report for European Application No. 16154938.1, dated Mar. 27, 2017, 5 pages.

Examination Report for European Application No. 16154940.7, dated Mar. 28, 2017, 5 pages.

Office Action for U.S. Appl. No. 14/634,599, dated Mar. 29, 2017, 23 pages.

Office Action for U.S. Appl. No. 14/634,609, dated Apr. 14, 2017, 24 pages.

Kapoor et al., Improved Large-Scale Process Cooling Operation through Energy Optimization, Nov. 22, 2013, Process 2013, 1, 312-329; doi: 10.3390/pr1030312.

Office Action for U.S. Appl. No. 14/634,573, dated Apr. 26, 2017, 22 pages.

Chang et al., Optimal chiller sequencing by branch and bound method for saving energy, 2004 Elsevier, 15 pages.

Office Action for U.S. Appl. No. 14/634,615, dated Jul. 11, 2017, 13 pages.

(56) References Cited

OTHER PUBLICATIONS

Examination Report for European Application No. 16154938.1, dated Oct. 11, 2017, 4 pages.

Examination Report for European Application No. 16154940.7, dated Oct. 16, 2017, 4 pages.

Gunter et al., Optimal Design of Grid-Connected PEV Charging System with Integrated Distributed Resources, IEEE Transactions on Smart Grid 4, Jun. 2013, 12 pages.

Office Action for U.S. Appl. No. 14/634,599, dated Nov. 3, 2017, 24 pages.

Office Action for U.S. Appl. No. 14/634,573, dated Dec. 14, 2017, 22 pages.

U.S. Appl. No. 13/802,154, filed Mar. 13, 2013, Johnson Controls Technology Company.

U.S. Appl. No. 13/802,233, filed Mar. 13, 2013, Johnson Controls Technology Company.

U.S. Appl. No. 13/802,279, filed Mar. 13, 2013, Johnson Controls Technology Company.

Third Office Action on Chinese application No. 201610104416.7 dated Jun. 24, 2019. 4 pages.

Third Office Action on Chinese Application No. on 201610107795.5 dated Jun. 25, 2019. 6 pages.

Notice of Allowance on U.S. Appl. No. 14/634,615 dated Jun. 4, 2018. 5 pages.

Office Action for European Patent Application No. 16154938.1, dated Mar. 6, 2018. 5 pages.

Office Action for European Patent Application No. 16154940.7 dated Mar. 9, 2018. 4 pages.

Office Action on Chinese Patent Application No. 201610104416.7 dated Mar. 26, 2018. 3 pages.

Office Action on Chinese Patent Application No. 201610107795.5 dated Mar. 28, 2018. 14 pages.

Office Action on European Patent Application No. 16154938.1 dated Aug. 15, 2018. 4 pages.

Office Action on U.S. Appl. No. 14/634,599 dated Nov. 2, 2018. 23 pages.

Notice of Allowance on U.S. Appl. No. 14/634,609 dated Aug. 29, 2018. 8 pages.

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.

Diederik Kingma and Jimmy Ba. Adam: A Method for Stochastic Optimization. In International Conference on Learning Representations (ICLR), 2015, 15 pages.

George EP Box, Gwilym M Jenkins, Gregory C Reinsei, and Greta M Ljung. Time Series Analysis: Forecasting and Control. John Wiley & Sons, 2015, chapters 13-15. 82 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.

K. J. Astrom. Optimal Control of Markov Decision Processes with Incomplete State Estimation. J. Math. Anal. Appl., 10:174-205, 1965.31 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identification, vol. 5. JSTOR, 1983, chapters 2, 3 & 7, 80 pages.

Lennart Ljung, editor. System Identification: Theory for the User (2nd Edition). Prentice Hall, Upper Saddle River, New Jersey, 1999, chapters 5 and 7, 40 pages.

Moritz Hardt, Tengyu Ma, and Benjamin Recht. Gradient Descent Learns Linear Dynamical Systems. arXiv preprint arXiv:1609.05191, 2016, 44 pages.

Nevena et al. Data center cooling using model-predictive control, 10 pages.

Sergio Bittanti, Marco C Campi, et al. Adaptive Control of Linear Time Invariant Systems: The "Bet on the Best" Principle. Communications in Information & Systems, 6(4):299-320, 2006. 21 pages.

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

Ashok et al., "An Optimization Mode for Industrial Load Management," IEEE Transactions on Power Systems, Nov. 2001, 16.4 , pp. 879-884.

Extended European Search Report on EP 19214769.2, dated Mar. 11, 2020, 8 pages.

Guan et al., "Energy-Efficient Buildings Facilitated by Microgrid," IEEE Transactions on Smart Grid, Dec. 2010, 1.3, pp. 243-252.

Office Action on EP 19214769.2, dated Nov. 18, 2020, 6 pages.

Cole et al., "Use of model predictive control to enhance the flexibility of thermal energy storage cooling systems," 2012 American Control Conference, Fairmont Queen Elizabeth, Montreal, Canada, Jun. 27-29, 2012, pp. 2788-2793.

Deng et al., "Optimal Scheduling of Chiller Plant with Thermal Energy Storage using mixed integer linear programming," 2013 American Control Conference (ACC), Washington. DC, USA, Jun. 17-19, 2013, pp. 2958-2963.

Gunter et al., "Optimal Design of Grid-Connected PEV Charging Systems With Integrated Distributed Resources," IEEE Transactions on Smart Grid, Jun. 2013, vol. 4, No. 2, pp. 956-967.

Henze et al., "Optimization of Building Thermal Mass Control in the Presence of Energy and Demand Charges," ASHRAE Transactions, 2008, vol. 114, part 2, pp. 75-84.

Infanger, "Planning Under Uncertainty: Solving Large-Scale Stochastic Linear Programs," Department of Operation Research, Stanford University, Technical Report SOL-92-8, Dec. 1992, 118 pages.

Office Action on EP 19214769.2, dated Apr. 13, 2021, 6 pages.

Wenzel et al., "Model Predictive Control for Central Plant Optimization with Thermal Energy Storage," International High Performance Buildings Conference, Jul. 14-17, 2014, Paper 122, 11 pages.

Office Action on EP 19214769.2, dated Sep. 6, 2021, 4 pages.

U.S. Office Action on U.S. Appl. No. 14/634,615 dated Jan. 29, 2018. 19 pages.

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automatio n_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

EP Extended Search Report on EP Appl. Ser. No. EP 22192523 dated Nov. 15, 2022 (8 pages).

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images),"URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation,"URL: http://cooljohnson.com/Building-Automation-

(56) References Cited

OTHER PUBLICATIONS

Systems-Michigan/Oakland-County-Michigan/Building-Automation-Divine-Grace.html, retrieved from internet Oct. 27, 2022 (3 pages)
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet dated 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943 filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

* cited by examiner

BUILDING MANAGEMENT SYSTEM FOR FORECASTING TIME SERIES VALUES OF BUILDING VARIABLES

CROSS-REFERENCE TO RELATED PATENT APPLICATIONS

This application is a continuation-in-part of U.S. patent application Ser. No. 14/634,609 filed Feb. 27, 2015, which claims the benefit of and priority to U.S. Provisional Patent Application No. 61/987,361 filed May 1, 2014. Both U.S. patent application Ser. No. 14/634,609 and U.S. Provisional Patent Application No. 61/987,361 are incorporated by reference herein in their entireties.

BACKGROUND

The present invention relates generally to building management systems, and more particularly to systems and methods for forecasting time series values in a building management system. A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof.

A BMS may be configured to operate in a manner that reduces energy consumption, uses renewable energy, and/or preserves natural resources. Recent advances in the field of energy-efficient building control systems aim at minimizing the energy consumption and/or cost of operating a BMS. In order to achieve this, an optimization technique may be used. The optimization techniques used by a BMS generally rely on knowledge of the performance of a facility, campus, building, or an energy plant over a horizon into the future. Such a performance can be characterized by various loads (e.g., hot water, cold water, and/or electric load).

For Building Wide Optimization (BWO), it may be advantageous to forecast the heating, cooling, and/or electricity consumption loads of a facility over a time horizon into the future. The horizon may be as short as few hours to ten days into the future, depending on the application in hand. Furthermore, for the purpose of minimizing electricity cost, it may be advantageous to know the electricity rates over the time horizon. It can be difficult and challenging to forecast loads and other types of time series values in a BMS.

SUMMARY

One implementation of the present disclosure is a building management system (BMS) configured to generate predictive models used to forecast time series values of building variables monitored by the BMS. The BMS includes one or more sensors configured to measure time series values of the building variables. The BMS includes a deterministic model generator configured to use historical BMS data comprising historical values for the time series of building variables to train one or more deterministic models that predict deterministic values for the time series. The BMS includes a stochastic model generator configured to use differences between actual values for the time series and the deterministic values predicted by the one or more deterministic models to train a stochastic model that predicts a stochastic value for the time series. The BMS includes a forecast adjuster configured to adjust the deterministic values predicted by the one or more deterministic models using the stochastic value predicted by the stochastic model to generate an adjusted forecast for the time series. The BMS includes a demand response optimizer configured to use the adjusted forecast for the time series to generate an optimal set of control actions for building equipment. The BMS includes building equipment configured to use the optimal set of control actions to affect one or more of the building variables monitored by the BMS by operation of the building equipment.

In some embodiments, the time series values include at least one of load values, energy consumption values, utility rate values, and photovoltaic energy generation values. The load values may include, for example, cold water loads, hot water loads, electric loads, heating loads, cooling loads, or any other type of load that can be served and/or produced by HVAC equipment or other equipment in a BMS.

In some embodiments, the BMS includes a binning module configured to organize the historical BMS data into a plurality of bins according to a binning parameter associated with the historical BMS data. The binning parameter may include, for example, a time at which the historical BMS data was generated, a schedule associated with the historical BMS data, and/or a type of variable represented by the historical BMS data. The deterministic model generator may train one or more deterministic models for each of the plurality of bins.

In some embodiments, the BMS includes a day-type classifier configured to identify one or more days represented by the historical BMS data that have similar time-variant profiles with respect to a particular time series feature. In various embodiments, the time series feature may be any measured, calculated, or specified variable or parameter that varies as a function of time. The day-type classifier may organize the historical BMS data into a plurality of day-type groups such that the historical BMS data corresponding to the days with similar time-variant profiles are organized into the same day-type group.

In some embodiments, the BMS includes an archetypal profile generator configured to generate an archetypal time-variant profile for a plurality of days within the same day-type group. The archetypal profile may describe the typical behavior of the days within the day-type group with respect to the particular time series value (e.g., typical load behavior) and may be based on the historical BMS data.

In some embodiments, the deterministic model generator is a regression model generator configured to generate one or more regression models that predict the deterministic value of the time series. The regression model generator may use the historical BMS data to train regression coefficients of the one or more regression models. In some embodiments, the regression model generator includes a weather model generator configured to generate a weather regression model that predicts a weather variable as a function of an archetypal load value. The weather variable may include at least one of an outside air temperature, an outside air humidity, an outside air enthalpy, cooling degree days, heating degree days, cooling energy days, and heating energy days. In some embodiments, the regression model generator includes a deterministic load model generator configured to generate a deterministic load regression model that predicts a deterministic load as a function of (a) the archetypal load value and (b) a difference between the weather variable by the weather regression model and an actual value for the weather variable.

In some embodiments, the stochastic model generator is an autoregressive (AR) model generator configured to generate an AR model that predicts a difference between a deterministic value predicted by the one or more deterministic models and an actual value for the time series. The AR model generator may train the AR model using a history of differences between the deterministic values predicted by the one or more deterministic models and the actual values for the time series.

In some embodiments, the forecast adjuster is configured to add the stochastic value predicted by the stochastic model to a deterministic value predicted by the one or more deterministic models to generate the adjusted forecast for the time series.

Another implementation of the present disclosure is a forecasting system configured to forecast time series values in a building management system (BMS). The forecasting system includes a load/rate predictor configured to use one or more deterministic models trained with historical BMS data to predict a deterministic value for the time series. The load/rate predictor is configured to use a stochastic model trained with differences between actual values for the time series and deterministic values predicted by the one or more deterministic models to predict a stochastic value for the time series. The load/rate predictor includes a forecast adjuster configured to adjust the deterministic values predicted by the one or more deterministic models using the stochastic value predicted by the stochastic model to generate an adjusted forecast for the time series.

In some embodiments, the one or more deterministic models include a first regression model and a second regression model. The first regression model may predict a deterministic value for the time series as a function of at least two predictor variables that are correlated with one another. The second regression model may predict one of the correlated predictor variables as a function of another of the correlated predictor variables. In some embodiments, the first regression model predicts the deterministic value for the time series as a function of a difference between the value of the correlated predictor variable predicted by the second regression model and an actual value of the correlated predictor variable predicted by the second regression model. The load/rate predictor may use the second regression model to eliminate a correlation between the correlated predictor variables in the first regression model.

In some embodiments, the time series values include at least one of load values, energy consumption values, utility rate values, and photovoltaic energy generation values. The load values may include, for example, cold water loads, hot water loads, electric loads, heating loads, cooling loads, or any other type of load that can be served and/or produced by HVAC equipment or other equipment in a BMS.

In some embodiments, the load/rate predictor is configured to use an archetypal profile for a particular time series feature to determine an archetypal value for the time series based on a time-of-day. In various embodiments, the time series feature may be any measured, calculated, or specified variable or parameter that varies as a function of time. The load/rate predictor may use the archetypal value for the time series as an input to the one or more deterministic models to calculate the deterministic value for the time series.

In some embodiments, the load/rate predictor uses a forecasted weather value as an input to the one or more deterministic models to calculate the deterministic value for the time series.

Another implementation of the present disclosure is a method for forecasting time series values in a building management system (BMS). The method includes using one or more regression models trained with historical BMS data for time series to forecast a deterministic value for the time series. The method includes using a history of residuals for the time series to forecast a residual for the time series. The residuals are differences between forecasted deterministic values for the time series and actual values for the time series. The method further includes using the forecasted residual for the time series to adjust the forecasted deterministic value.

In some embodiments, the time series values include at least one of load values, energy consumption values, utility rate values, and photovoltaic energy generation values.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
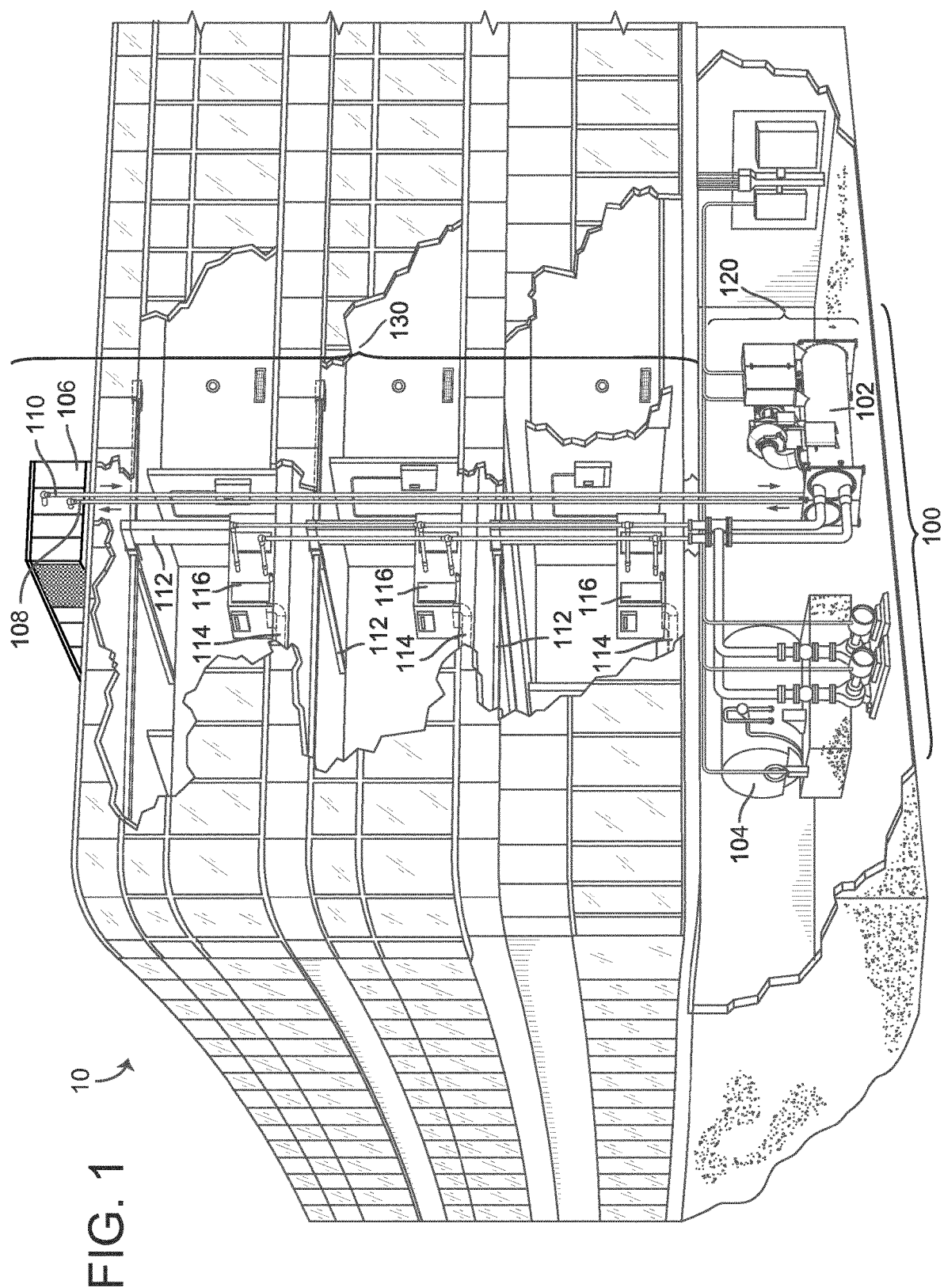
FIG. 1 is a perspective view of a building served by a building management system (BMS), according to an exemplary embodiment.

Referring generally to the FIGURES, systems and methods for forecasting time series values in a building management system (BMS) are shown, according to various exemplary embodiments. A BMS is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof.

The systems and methods described herein may be used to forecast various types of loads in a BMS (e.g., heating loads, cooling loads, electricity consumption loads, etc.) as well as other types of time series values used or processed by the BMS (e.g., photovoltaic energy generation, utility rates, etc.). For example, a load/rate predictor may be configured to generate a load forecast $\hat{l}(t)$ for any time t over a predetermined horizon into the future. The load forecast $\hat{l}(t)$ may include a deterministic value $\hat{l}_{det}(t)$ and a stochastic value $\hat{l}_{sto}(t)$.

The deterministic value $\hat{l}_{det}(t)$ may be estimated using one or more deterministic models (e.g., linear regression models). The deterministic models may be generated offline and trained with historical load and weather data. For example, the historical load and weather data for a facility may be divided into a plurality of bins based on one or more binning parameters associated with the data (e.g., a time at which the data are collected, a session schedule, a type of load, etc.). The data within each bin may be further divided into a plurality of day-type groups. Each of the days within a day-type group may have a similar time-variant load profile (e.g., load as a function of time throughout the day). An archetypal load profile may be generated for each of the day-type groups. The archetypal load profile may represent the typical load profile of the days within the day-type group. The archetypal load profile may be used to estimate an archetypal load value $\hat{l}_{arc}(t)$ for any given time-of-day t.

In some embodiments, the archetypal load values are used in conjunction with the historical weather data to train a first regression model (i.e., a weather model) that predicts a weather variable $\hat{\varphi}(t)$ (e.g., outside air enthalpy, outside air temperature, outside air humidity, etc.) as a function of an archetypal load value $\hat{l}_{arc}(t)$. The output of the weather model may be used in conjunction with the historical load data and the historical weather data to train a second regression model (i.e., a deterministic load model) that predicts the deterministic load value $\hat{l}_{det}(t)$ as a function of the archetypal load value $\hat{l}_{arc}(t)$ and a weather residual (e.g., a difference between the predicted weather variable $\hat{\varphi}(t)$ and actual value of the weather variable $\varphi(t)$ defined by the historical weather data). Advantageously, the two-stage regression may account for and eliminate any correlation between the weather variable $\varphi(t)$ and the archetypal load value $\hat{l}_{arc}(t)$ in the deterministic load model. In some embodiments, a set of deterministic models is generated for each of the day-type groups. The deterministic models may then be used online to predict the deterministic load value $\hat{l}_{det}(t)$ as a function of a current or forecasted weather variable for any given time t.

The stochastic value $\hat{l}_{sto}(t)$ may be estimated using an autoregressive (AR) model. The AR model may be generated offline and trained with residuals from the deterministic models. For example, the predicted deterministic load values $\hat{l}_{det}(t)$ from each set of deterministic models may be subtracted from actual (e.g., measured) load values l(t) to calculate load residuals r(t). The load residuals r(t) from each set of deterministic models may be used to train the AR model. When new load measurements are obtained, the load residuals r(t) may be updated. The current and past values of the load residuals r(t) may be calculated and used to train the AR model. The AR model may then be used online to predict the stochastic value $\hat{l}_{sto}(t)$ for any forecasted time t. For example, the stochastic value $\hat{l}_{sto}(t)$ may be the value of the time series of load residuals r(t) predicted by the AR model for time t.

The load/rate predictor may adjust the deterministic load value $\hat{l}_{det}(t)$ using the stochastic load value $\hat{l}_{sto}(t)$ to calculate the load forecast $\hat{l}(t)$ (e.g., $\hat{l}(t)=\hat{l}_{det}(t)+\hat{l}_{sto}(t)$). Advantageously, the adjustment provided by the stochastic load value $\hat{l}_{sto}(t)$ compensates for current and past forecast errors, thereby increasing the accuracy of the forecast and allowing for adaptive forecasting. These and other features of the present invention are described in greater detail in the following paragraphs.

Building Management System and HVAC System

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown, according to an exemplary embodiment. Building 10 is serviced by a building management system including a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
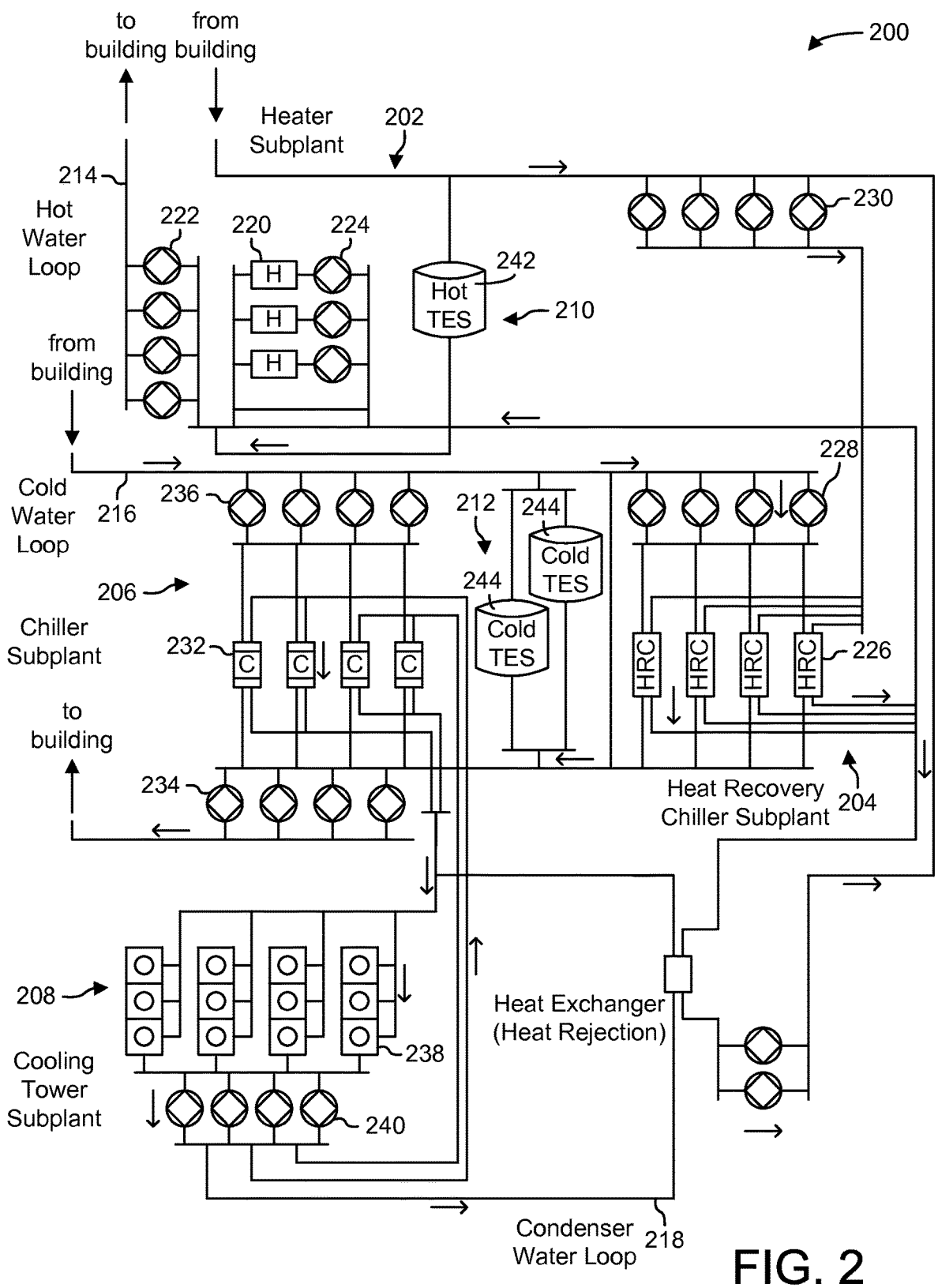
FIG. 2 is a block diagram of a waterside system which may be used in conjunction with the BMS of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
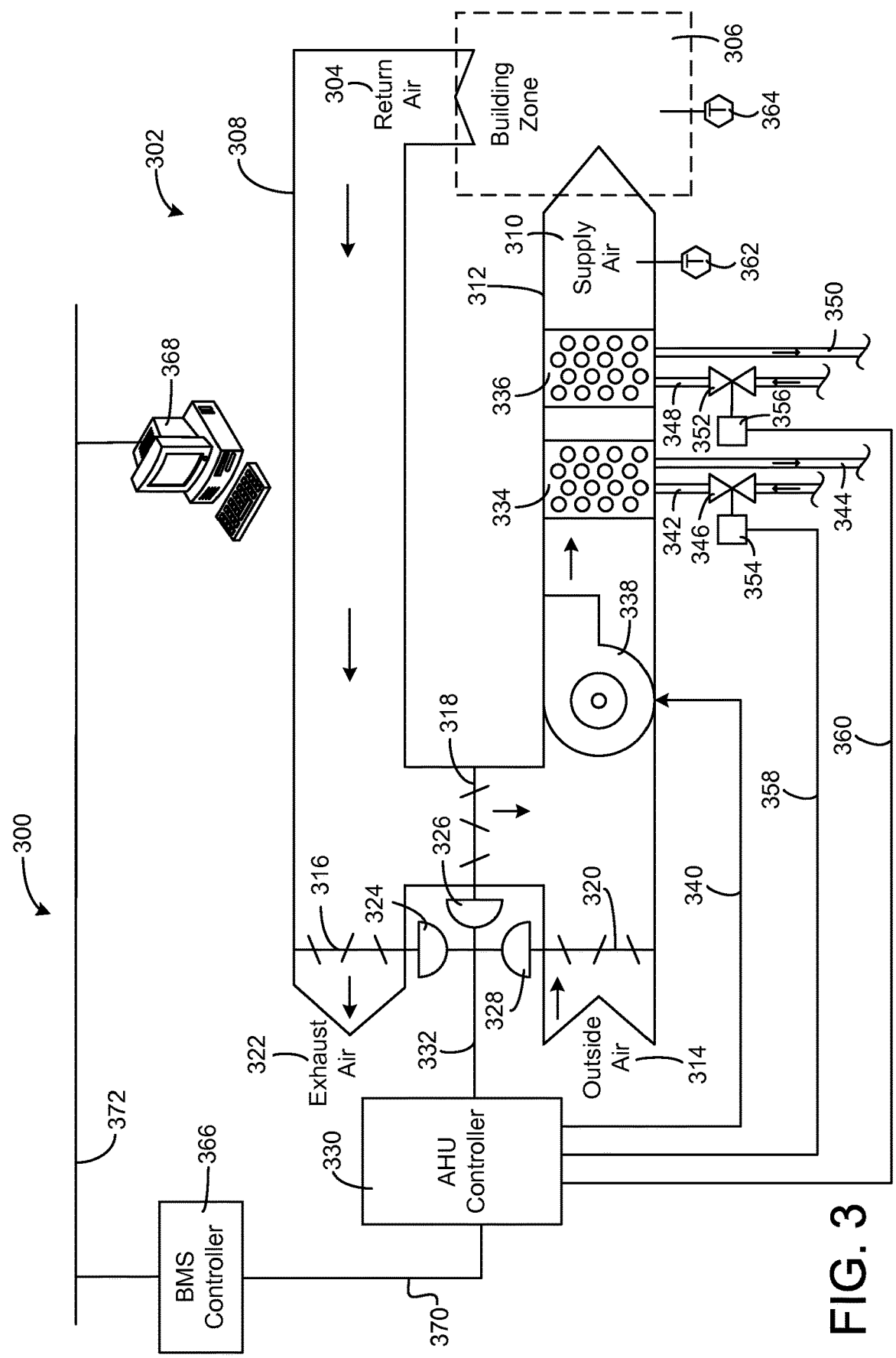
FIG. 3 is a block diagram of an airside system which may be used in conjunction with the BMS of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
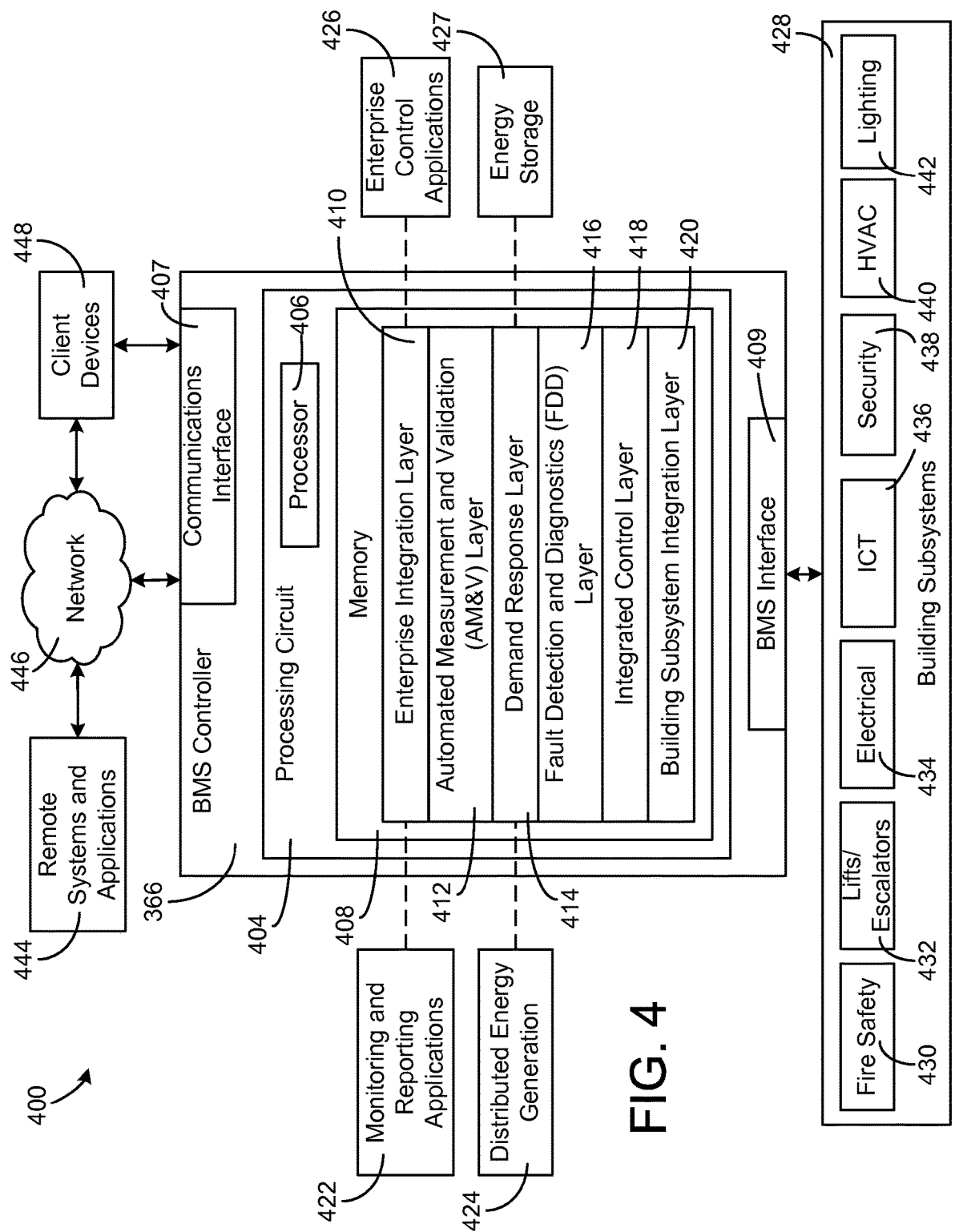
FIG. 4 is a block diagram of the BMS of FIG. 1, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Forecasting Time Series Values of Building Variables

Figure 5:
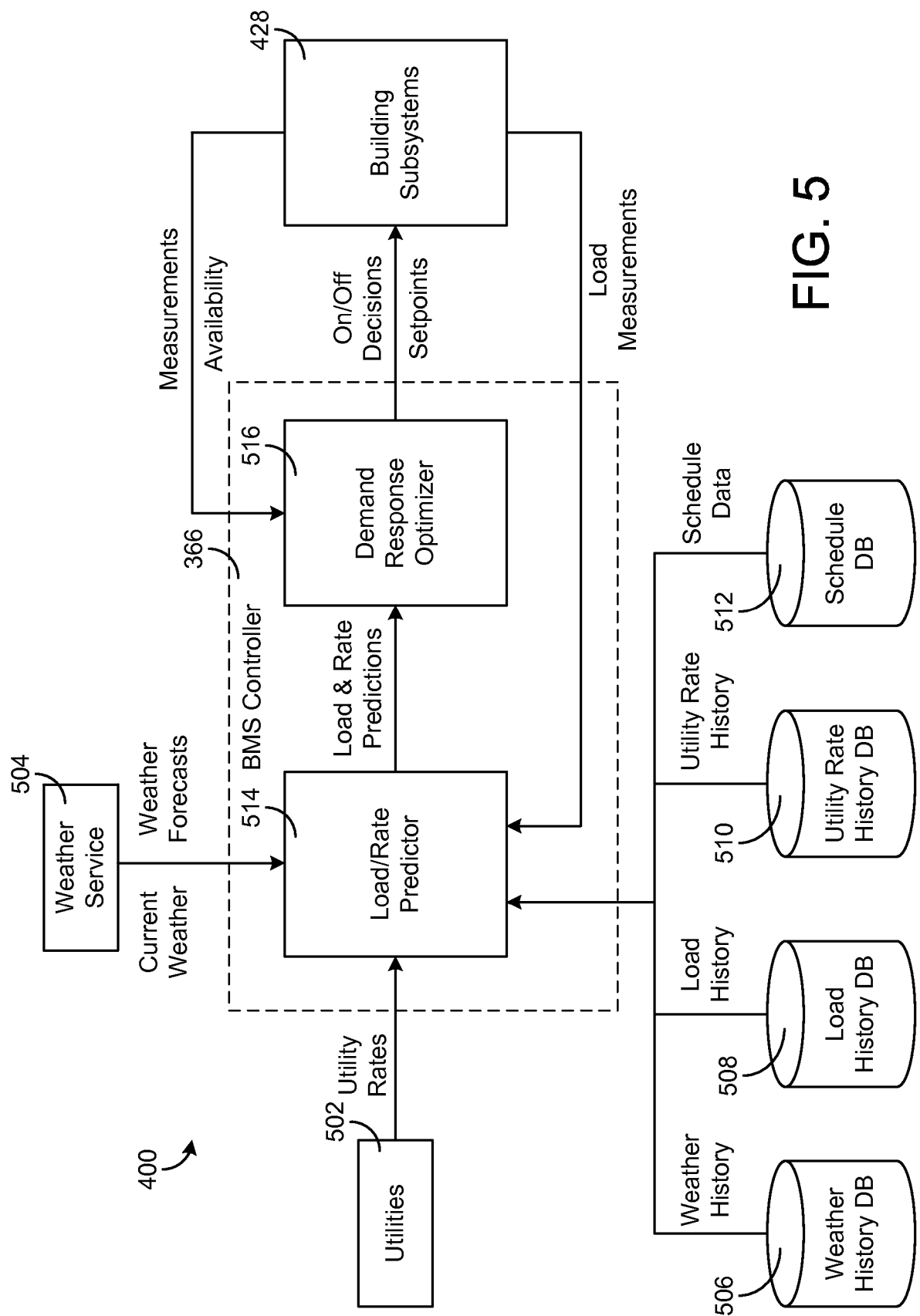
FIG. 5 is a block diagram illustrating a portion of the BMS of FIG. 4 in greater detail, including a load/rate predictor configured to forecast loads served by the BMS, according to an exemplary embodiment.

Referring now to FIG. 5, a block diagram illustrating a portion of BMS 400 in greater detail is shown, according to an exemplary embodiment. BMS 400 is shown to include a load/rate predictor 514 and a demand response optimizer 516. In some embodiments, load/rate predictor 514 and demand response optimizer 516 are components of BMS controller 366 (e.g., components of demand response layer 414, integrated control layer 418, building subsystem integration layer 420, or otherwise implemented within memory 408). In other embodiments, load/rate predictor 514 and demand response optimizer 516 are independent components of BMS 400 (i.e., separate from BMS controller 366).

Load/rate predictor 514 may be configured to predict or forecast the thermal energy loads $\hat{l}(t)$ of a facility served by BMS 400. The forecasted loads $\hat{l}(t)$ may include heating loads (e.g., hot water loads), cooling loads (e.g., cold water loads), electric consumption loads, and/or any other type of load served by BMS 400. Load/rate predictor 514 may forecast loads $\hat{l}(t)$ at a particular instant in time t and/or for each of h time steps within an optimization period (e.g., forecasting $\hat{l}(t)$ for each time step t=1 . . . h).

Load/rate predictor 514 is shown receiving weather forecasts from a weather service 504. In some embodiments, load/rate predictor 514 estimates the thermal energy loads $\hat{l}(t)$ as a function of the weather forecasts. In some embodiments, load/rate predictor 514 uses feedback from building subsystems 428 to estimate the thermal energy loads $\hat{l}(t)$. Feedback from building subsystems 428 may include various types of sensory inputs (e.g., temperature, flow, humidity, enthalpy, etc.) or other data relating to the controlled facility (e.g., inputs from a HVAC system, a lighting control system, a security system, a water system, etc.). In some embodiments, the feedback from building subsystems 428 includes load measurements. Load measurements may include, for example, a heating load, a cooling load, an electric load, or any other type of load served by building subsystems 428.

In some embodiments, load/rate predictor 514 uses a deterministic plus stochastic model trained from historical load data to predict loads $\hat{l}(t)$. The deterministic part of the model may estimate a deterministic load value $\hat{l}_{det}(t)$ as a function of a given weather forecast $\hat{\phi}_w(t)$, a day-type day, and the time of day t. The stochastic part of the model may estimate a stochastic load value $\hat{l}_{sto}(t)$ based on current and past forecast errors and may use the stochastic load value $\hat{l}_{sto}(t)$ to adjust the deterministic load value $\hat{l}_{det}(t)$. For example, the stochastic load value $\hat{l}_{sto}(t)$ may be added to the deterministic load value $\hat{l}_{det}(t)$ to calculate the predicted load $\hat{l}(t)$ (i.e., $\hat{l}(t)=\hat{l}_{det}(t)+\hat{l}_{sto}(t)$). The deterministic plus stochastic model may be trained offline using historical load data from load history database 508 and historical weather data from weather history database 506. The deterministic plus stochastic model may then be used online to predict a load $\hat{l}(t)$ as a function of current weather data and/or weather forecasts from weather service 504.

To develop the deterministic part of the model, load/rate predictor 514 may access historical load data from load history database 508. Load history database 508 may include a history of time series load values and/or other time series values that are measured or calculated in BMS 400. For example, load history database 508 may include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time series values that provide information about the performance of BMS 400 or a component thereof.

In some embodiments, the time series values in load history database 508 are measured by various sensors of BMS 400. For example, BMS 400 may include one or more temperature sensors, humidity sensors, enthalpy sensors, pressure sensors, lighting sensors, flow rate sensors, voltage sensors, valve position sensors, load sensors, resource consumption sensors, and/or any other type of sensor capable of measuring a variable of interest in BMS 400. BMS 400 may use the sensors to measure values of one or more time series variables (e.g., environmental variables, control variables, etc.) or parameters that are monitored by BMS 400. BMS 400 may use the time series values to calculate a load value for each of a plurality of times. A history of such load values may be stored in load history database 508. In some embodiments, the load values in load history database 508 are measured values observed by load sensors of BMS 400. In other embodiments, the load values in load history database 508 are provided by an external data source (e.g., load data from a utility supplier).

Similarly, the time series values in weather history database 506 may be measured by various sensors of BMS 400 or by an external weather service. For example, BMS 400 may include one or more temperature sensors, humidity sensors, enthalpy sensors, precipitation sensors, and/or any other type of sensor capable of measuring a weather-related variable. BMS 400 may use the sensors to measure values of one or more time series weather variables describing weather conditions for the geographic location of BMS 400. BMS 400 may use the time series values to calculate or identify a value for a weather-related variable at each of a plurality of times. A history of such weather-related variables may be stored in weather history database 506. In some embodiments, the weather-related values in weather history database 506 are measured values observed by sensors of BMS 400. In other embodiments, the weather-related values in weather history database 506 are provided by an external data source (e.g., weather service 504).

Load/rate predictor 514 may divide the historical load data into multiple different bins $n_{bins}$ based on the schedule data in schedule database 512, where $n_{bins}$ is the total number of bins. In some embodiments, the historical load data are divided into bins based on the type of load associated with the load data. Load/rate predictor 514 may analyze the historical load data in each bin to identify days that have similar load profiles. The historical load data in each bin may be further classified into multiple different day-types $n_{day\text{-}types}$ based on the load profiles of each day (i.e., grouping days that have similar load profiles into a particular day-type). Thus, load/rate predictor 514 may define $n_{bins} \times n_{day\text{-}types}$ clusters of training data.

Load/rate predictor 514 may develop an archetypal load profile for each cluster of training data using the historical load data. The archetypal load profiles represent the typical load behavior of a facility throughout the day and may be used by load/rate predictor 514 to determine an archetypal load $l_{arc}(t)$ based on the time-of-day t. A different archetypal load profile may be developed for each of the $n_{bins} \times n_{day\text{-}types}$ clusters of training data (e.g., for each type of load and/or for each day-type). Load/rate predictor 514 may then develop a regression model for each cluster of training data. The regression model may be trained offline using historical load data from load history database 508 and historical weather data from weather history database 506 and/or weather service 504. The regression model may predict the deterministic load value $\hat{l}_{det}(t)$ at a particular time t as a function of the archetypal load $l_{arc}(t)$ and the weather forecast $\hat{\phi}_w(t)$ at time t. In some embodiments, the weather forecast $\hat{\phi}_w(t)$ is translated to an enthalpy value which captures the effect of both outside air temperature and outside air humidity simultaneously.

To use the deterministic part of the model, load/rate predictor 514 may access schedule database 512 to determine the day-type of the day being forecasted. Schedule database 512 may indicate a day-type associated with each day during an optimization period. Based on the determined day-type, load/rate predictor 514 may select a particular archetypal load profile and a particular regression model. Load/rate predictor 514 may use the archetypal load profile to determine an archetypal load value $l_{arc}(t)$ for a specific time-of-day t. Load/rate predictor 514 may use the archetypal load value $l_{arc}(t)$ and the weather forecast $\hat{\phi}_w(t)$ as inputs to the selected regression model in order to calculate the deterministic load value $\hat{l}_{det}(t)$.

To develop the stochastic part of the model, load/rate predictor 514 may use actual load measurements l(t) from building subsystems 428 to calculate load residuals. The load residuals may be differences between the actual measured loads l(t) and the deterministic load values $\hat{l}_{det}(t)$ predicted by the deterministic part of the model at each time t. Load/rate predictor 514 may use the load residuals to train an autoregressive (AR) model. The AR model may predict a residual for each time step t during the optimization period. As new load measurements are obtained from building subsystems 428, new load residuals may be calculated and added to a time series of load residuals.

To use the stochastic part of the model, load/rate predictor 514 may use the AR model to predict a future value of the time series of load residuals at time t. Future residual values may be predicted iteratively using the current and past residual values. The predicted value of the time series of load residuals at time t defines the stochastic load value $\hat{l}_{sto}(t)$. Load/rate predictor 514 may adjust the deterministic load value $\hat{l}_{det}(t)$ using the stochastic load value $\hat{l}_{sto}(t)$. For example, load/rate predictor 514 may add the stochastic load value $\hat{l}_{sto}(t)$ to the deterministic load value $\hat{l}_{det}(t)$ to calculate the forecasted load $\hat{l}(t)$.

In some embodiments, load/rate predictor 514 is configured to predict or forecast utility rates using a similar technique. For example, the deterministic plus stochastic model may be trained offline using historical utility rate data from utility rate history database 510. The deterministic plus stochastic model may then be used online to predict future utility rates as a function of current utility rates provided by utilities 502. Load/rate predictor 514 is described in greater detail with reference to FIG. 6.

Still referring to FIG. 5, load/rate predictor 514 is shown providing load and rate predictions to demand response optimizer 516. Demand response optimizer 516 may perform an optimization process to optimize the performance of building subsystems 428. The optimization process may use the load and rate predictions from load/rate predictor 514 as inputs to an optimization routine. Demand response optimizer 516 may use the load and rate predictions to determine an optimal set of control actions for a collection of BMS devices (e.g., chillers, cooling towers, pumps, fans, heaters, etc.).

In some embodiments, the optimization process performed by demand response optimizer 516 is a cascaded optimization process, as described in U.S. patent application Ser. No. 14/634,609 filed Feb. 27, 2015. For example, demand response optimizer 516 may include a high level optimization module and a low level optimization module. The high level optimization module may control an outer loop of the cascaded optimization (e.g., a subplant level loop, a subsystem level loop, etc.). The high level optimization module may determine an optimal distribution of thermal energy loads across building subsystems 428 for each time step in the optimization period in order to optimize (e.g., minimize) the cost of energy consumed by building subsystems 428. In some embodiments, the optimal load distribution is based on measurements and availability information received from building subsystems 428.

The low level optimization module may control an inner (e.g., equipment level) loop of the cascaded optimization. The low level optimization module may determine how to best run each subsystem or subplant at the load setpoint determined by the high level optimization module. For example, the low level optimization module may determine on/off states and/or operating setpoints for various devices of building subsystems 428 in order to optimize (e.g., minimize) the energy consumption of each subsystem while meeting the thermal energy load setpoint for the subsystem. The on/off decisions and/or operating setpoints may be provided to building subsystems 428 for use in controlling the building equipment. Building subsystems 428 may measure the actual load l(t) and provide the actual load l(t) as feedback to load/rate predictor 514.

Figure 6:
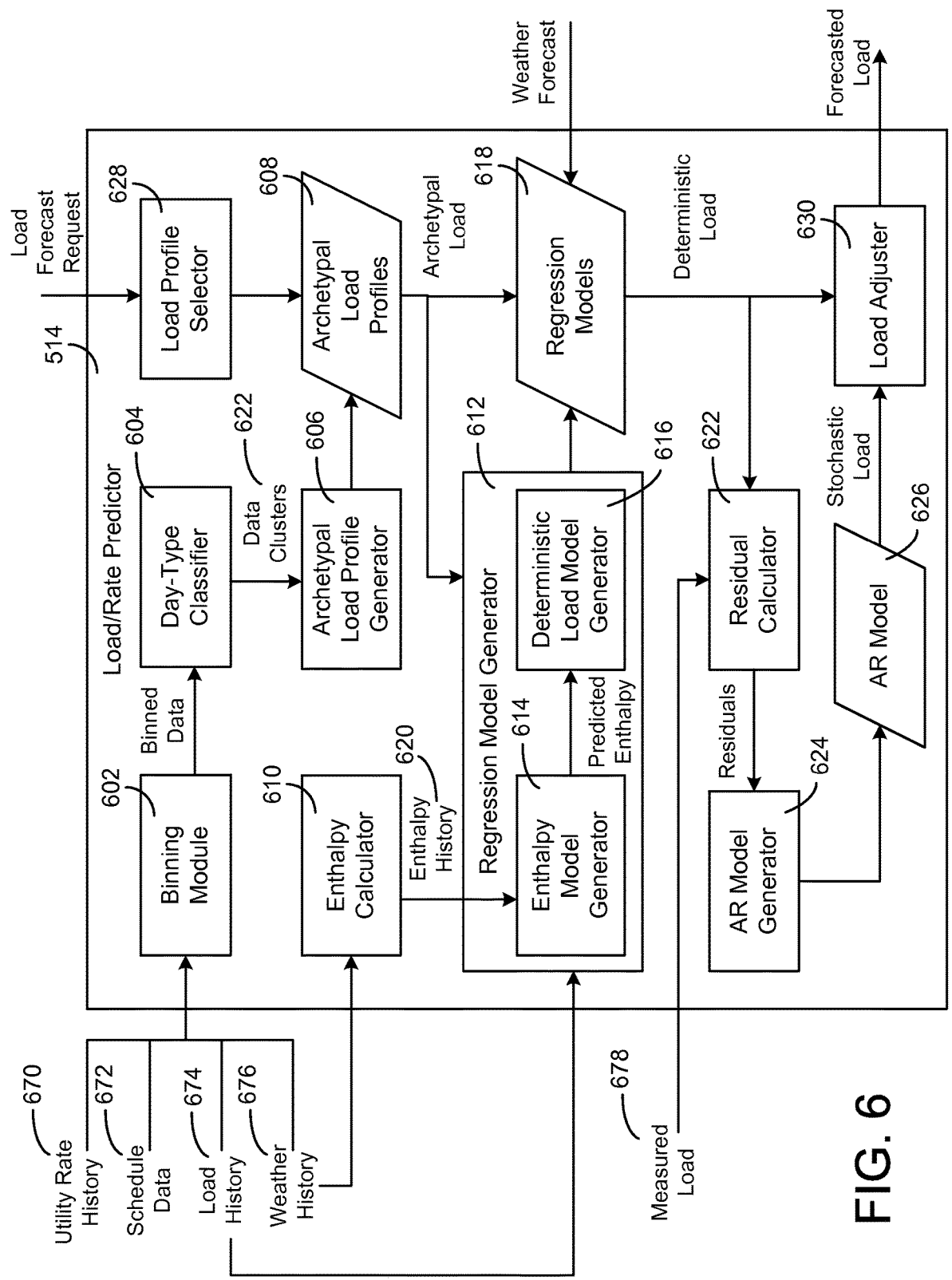
FIG. 6 is a block diagram illustrating the load/rate predictor of FIG. 5 in greater detail, according to an exemplary embodiment.

Referring now to FIG. 6, a block diagram illustrating load/rate predictor 514 in greater detail is shown, according to an exemplary embodiment. Load/rate predictor 514 may be configured to generate and use a deterministic plus stochastic model to forecast various loads (e.g., heating loads, cooling loads, electricity consumption loads, etc.) and utility rates (e.g., water rates, natural gas rates, electricity rates, etc.). The deterministic plus stochastic model may be trained offline using historical load data, weather data, and/or utility rate data. Load/rate predictor 514 may then use the deterministic plus stochastic model online to forecast loads based on a current or future weather forecast.

Load/rate predictor 514 is shown to include an enthalpy calculator 610. Enthalpy calculator 610 may be configured to receive weather history data 676 (e.g., from weather history database 506) and to calculate a historical outside air enthalpy (OAE) 620 based on the weather history data 676. For example, weather history data 676 may include historical outside air temperature (OAT) data and historical outside air humidity (OAH) data. The OAT data and the OAH data may be measured by one or more temperature sensors and/or humidity sensors of BMS 400 or received from a weather service 504 such as the National Oceanic and Atmospheric Administration (NOAA). Enthalpy calculator 610 may use the OAT data and the OAH data to calculate a historical OAE value 620 at each time t represented in the weather history data 676. Enthalpy calculator 610 may provide the historical OAE values 620 to regression model generator 612 for use in generating regression models 618.

Enthalpy calculator 610 may also calculate an OAE value based on current or forecasted weather data. For example, enthalpy calculator 610 may receive a current or forecasted OAT and OAH from weather service 504 (e.g., via the NOAA's National Digital Forecast Database (NDFD) service). Enthalpy calculator 610 may use the current or forecasted OAT and OAH to calculate a current or forecasted OAE. Enthalpy calculator 610 may provide the current or forecasted OAE values as inputs to regression models 618 for use in calculating the deterministic load value $\hat{l}_{det}(t)$. Advantageously, the use of OAE as the weather parameter in regression models 618 captures the effect of both OAT and OAH simultaneously.

Still referring to FIG. 6, load/rate predictor 514 is shown to include a binning module 602. Binning module 602 may be configured to collect or receive historical data and to organize the historical data into various bins (e.g., sets, groups, categories, etc.). For example, binning module 602 is shown receiving weather history data 676 (e.g., from weather history database 506), load history data 674 (e.g., from load history database 508), utility rate history data 670 (e.g., from utility rate history database 510), and schedule data 672 (e.g., from schedule database 512). Binning module 602 may organize the data into bins based on one or more binning parameters associated with the data. In some embodiments, binning module 602 organizes the historical data into $n_{bins}$ different bins, where $n_{bins}$ is the total number of bins.

A bin may be a collection of data values that are related by a given parameter. The parameter may be a measurable quantity that relates the data values within a given bin. For example, a binning parameter may indicate the time the data was generated such that the bins are related by time. In some embodiments, binning module 602 uses the time at which the data was generated in conjunction with schedule data 672 to determine whether the data is in-session or out-of-session (e.g., based on a session schedule defined by schedule data 672). In-session data may be grouped in one bin, whereas out-of-session data may be grouped in another bin. If the bins are based on time, each of the data values collected may include a time stamp (e.g., 6:00 AM). Binning module 602 may separate the data values and place the data values into bins based on the corresponding time stamps.

In some embodiments, the binning parameters indicate a type of load associated with the data (e.g., heating, cooling, electricity, etc.), a weather parameter at the time the data was generated (e.g., outside air temperature, humidity, enthalpy, etc.), the operating mode of the system at the time the data was generated, or any other feature or attribute that can be used to classify or organize the data. For example, bins could be based on outside air temperature (e.g., data values collected while the outside air temperature is between 80° F. and 85° F.). More than one binning parameter may be associated with a single data value. Binning parameters may be applied to a data value when the data value is initially generated or at any time before the data values are organized into bins. The data values may be collected in distinct bins, or the data may be separated into bins after the data has been collected. Binning module 602 may provide the binned data to day-type classifier 604.

Figure 10:
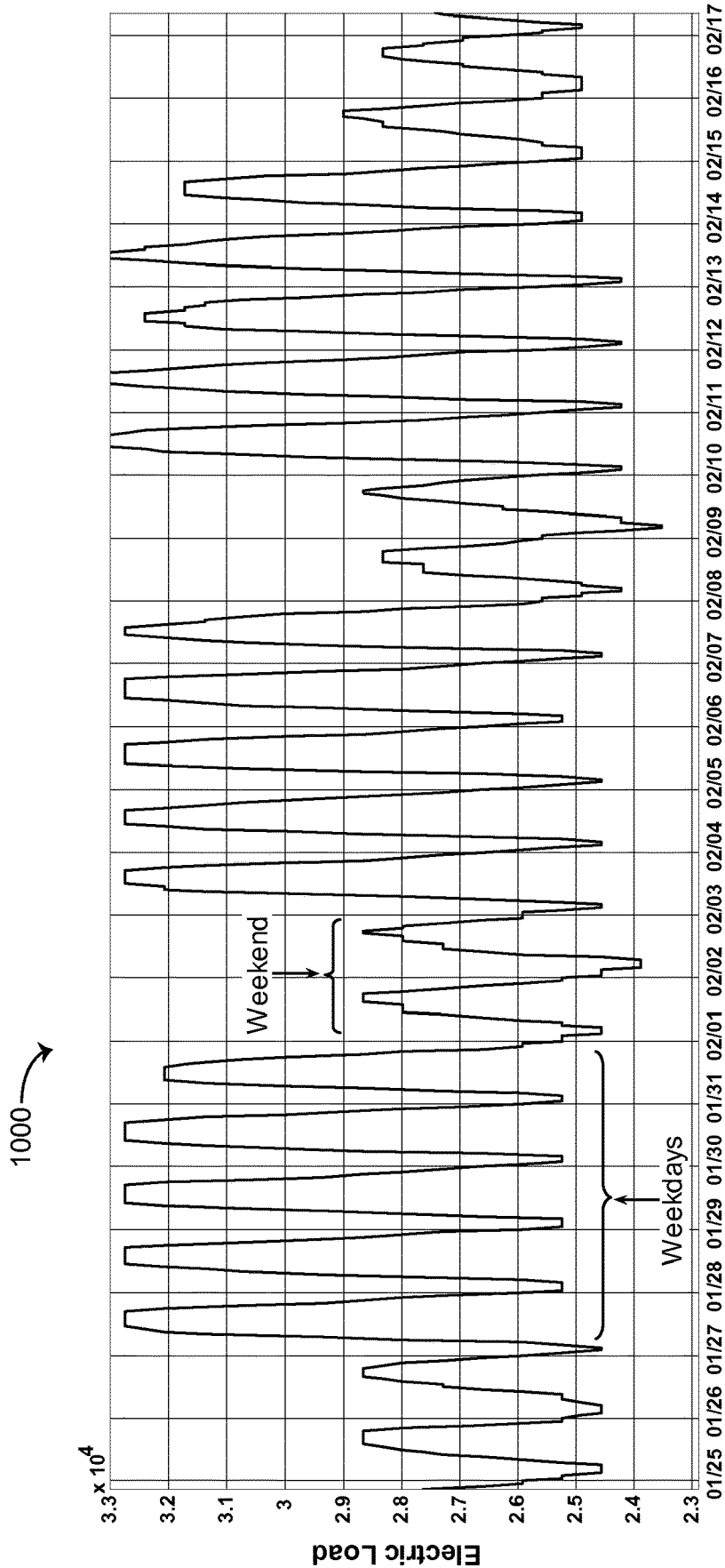
FIG. 10 is a graph of a load profile that has different load characteristics on weekdays vs. weekends, indicating that weekdays belong to one day-type group whereas weekends belong to another day-type group, according to an exemplary embodiment.

Still referring to FIG. 6, load/rate predictor 514 is shown to include a day-type classifier 604. Day-type classifier 604 may be configured to analyze the binned load data to determine which days of the week have similar load profiles. The load profile of a facility can vary significantly from one day of the week to another. For example, the historical load data for an office building may indicate that Monday through Friday (i.e., when workers are present) are similar to one another in terms of electricity consumption, whereas Saturday and Sunday have a different electricity consumption profile. In this example, day-type classifier 604 may classify Monday through Friday as a first day-type, and Saturday and Sunday as a second day-type. FIG. 10 illustrates an exemplary electricity consumption curve over several weeks for a facility that has different load profiles on weekdays and weekends.

Different facilities may have different day-type classifications for the same type of load. For example, the historical electricity consumption data for a restaurant that is closed on Mondays may indicate that Monday has a first day-type, whereas Tuesday through Sunday have a second day-type. In some embodiments, day-types are particular to a specific type of load (e.g., heating, cooling, electricity consumption) or any other binning parameter. For example, the same facility may have one day-type classification for electricity consumption and another (different) day-type classification for heating load. Day-type classifier 604 may be configured to analyze the binned historical load data provided by binning module 602 and automatically determine an appropriate day-type classification for a particular facility. Advantageously, the day-typing performed by day-type classifier 604 captures the effect of the day of the week on a load forecast.

In some embodiments, day-type classifier 604 uses a pattern recognition technique to statistically determine which days have similar load profiles. The pattern recognition technique may be the same or similar to the pattern recognition technique described in U.S. Pat. No. 6,816,811, issued to Seem on Nov. 9, 2004, the entire disclosure of which is incorporated by reference herein. For example, day-type classifier 604 may analyze a time series of load data (i.e., the historical load data) to identify daily features of the load data. Daily features may include, for example, the average daily load and the peak daily load over a predetermined time period. The daily features may be transformed in order to alleviate the effect of seasonal load changes. Day-type classifier 604 may create seven data clusters, where each cluster corresponds to a particular day of the week. Univariate and/or multivariate outlier identification procedures may be applied to each cluster to remove any abnormal or unusual feature vectors. Day-type classifier 604 may use a clustering analysis to identify days of the weeks with similar load profiles.

In some embodiments, day-type classifier 604 organizes the historical data within each of the $n_{bins}$ bins into $n_{day-types}$ different day-types, where $n_{day-types}$ is the total number of different day types. Accordingly, the historical data may be divided into $n_{bins} \times n_{day-types}$ clusters, where each cluster includes one of the clusters of training data 622. Each cluster may correspond to a unique combination of one of the $n_{bins}$ bins and one of the $n_{day-types}$ day-types. Day-type classifier 604 may provide the clusters of training data 622 to archetypal load profile generator 606.

Still referring to FIG. 6, load/rate predictor 514 is shown to include an archetypal load profile generator 606. The days represented in a cluster may have similar load profiles by virtue of being within the same day-type group. Archetypal load profile generator 606 may be configured to develop an archetypal load profile 608 for each of the clusters. An archetypal load profile for a cluster of load profiles may be a typical or representative load profile for the days within the cluster. For example, an archetypal load profile for electricity consumption may indicate the typical electricity consumption of a facility throughout the day (e.g., as a function of time) and may take into account time-of-day t. Advantageously, the archetypal load profiles 608 capture the effect of the time-of-day t on the forecasted load and may be used by load/rate predictor 514 to determine an archetypal load value $l_{arc}(t)$ for a facility based on the time-of-day t. An exemplary archetypal load profile is described in greater detail with reference to FIG. 11.

In some embodiments, archetypal load profile generator 606 generates an archetypal load profile for a cluster of training data (i.e., a cluster of similar load profiles) by determining a curve that best represents or best fits the cluster of load profiles. For example, archetypal load profile generator 606 may generate a spline (e.g., a piecewise-defined function of polynomials) that serves as the archetypal load profile for the cluster of similar load profiles. The spline may be defined by the points at which these polynomials connect. By predetermining the times of day for the connection points, an optimal load value for each connection point can be found using an optimization technique. For example, archetypal load profile generator 606 may optimize (e.g., minimize) the following objective function to determine optimal load values for the connection points:

$$J = \min_{y_s}\left(\sum_{i=1}^{m}(y_i - \hat{y})^T(y_i - \hat{y})\right)$$

where $y_s$ is a vector of the connection points, $y_i$ is a vector of actual load values for the ith full day in a cluster of training data, m is the total number of full days in the cluster of training data, and $\hat{y}$ is the estimated archetypal load profile.

In some embodiments, the archetypal load profile is a piecewise defined combination of splines connected at predetermined time values (e.g., periodically throughout the day) and optimized load values (e.g., determined using the optimization technique). For example, an archetypal load profile may consist of a set of cubic splines connected at optimized connection points. The archetypal load profiles 608 may be stored in memory and used by load/rate predictor 514 to calculate an archetypal load value $l_{arc}(t)$ for a given time-of-day t. The archetypal load values $l_{arc}(t)$ may be used offline to generate regression models, and online as an input to the regression models to calculate the deterministic load value $\hat{l}_{det}(t)$.

Still referring to FIG. 6, load/rate predictor 514 is shown to include a regression model generator 612. Regression model generator 612 may be configured to generate a set of regression models 618 for each cluster of training data 622. For each of the $n_{bins} \times n_{day-types}$ clusters of training data, a unique archetypal load profile 608 may exist. The deterministic load value $\hat{l}_{det,k}(t)$ for the kth cluster of training data may be dependent on both the archetypal load value $l_{arc,k}(t)$ and the outside air enthalpy $OAE_k(t)$ for the kth cluster of training data at time t. Additionally, the outside air enthalpy $OAE_k(t)$ may be correlated with the archetypal load value $l_{arc,k}(t)$. For example, a lower outside air enthalpy may generally correlate with an increased heating load and/or a reduced cooling load. Regression model generator 612 may generate a pair of regression models 618 for each of the $n_{bins} \times n_{day-types}$ clusters of training data using a two-stage regression process. Advantageously, two-stage regression process may orthogonalize (i.e., decouple) the predictor variables $OAE_k(t)$ and $l_{arc,k}(t)$.

In some embodiments, the regression models 618 include an enthalpy model and a deterministic load model. The enthalpy model may predict the outside air enthalpy $O\hat{A}E_k(t)$ as a function of the archetypal load value $l_{arc,k}(t)$. The deterministic load model may predict the deterministic load value $\hat{l}_{det,k}(t)$ as a function of the archetypal load value $l_{arc,k}(t)$, the estimated outside air enthalpy $O\hat{A}E_k(t)$ predicted by the enthalpy model, and the actual outside air enthalpy $OAE_k(t)$ based on measured or forecasted weather data. In various embodiments, any weather parameter (e.g., temperature, humidity, precipitation, etc.) may be used in place of the outside air enthalpy $OAE_k(t)$ in the regression models. Regression model generator 612 may train the regression models offline using load history data 674 and weather history data 676. Both the enthalpy model and the deterministic load model may be stored in regression models 618 and used online to calculate the deterministic load value $\hat{l}_{det,k}(t)$.

Regression model generator 612 is shown to include an enthalpy model generator 614. Enthalpy model generator 614 may be configured to generate an enthalpy model that predicts the outside air enthalpy $O\hat{A}E_k(t)$ as a function of the archetypal load value $l_{arc,k}(t)$. For example, enthalpy model generator 614 may generate an enthalpy model of the form:

$$OAE_k = \beta_0^k + \beta_1^k \hat{l}_{arc,k} + w$$

where $\beta_0^k$ and $\beta_1^k$ are enthalpy model coefficients for the kth cluster of training data ($k=1 \ldots n_{bins} \times n_{day\text{-}types}$), $OAE_k$ is a vector of historical enthalpy values for the kth cluster of training data (e.g., determined by enthalpy calculator 610), $\hat{l}_{arc,k}$ is a vector of archetypal load values that correspond to each of the historical enthalpy values in $OAE_k$, and $w$ is a vector of the enthalpy model error.

Enthalpy model generator 614 may use weather history data 676 and corresponding archetypal load data to train the enthalpy model and determine values for the enthalpy model coefficients $\beta_0^k$ and $\beta_1^k$. For example, enthalpy model generator 614 may use weather history data 676 and/or the historical enthalpy values calculated by enthalpy calculator 610 to populate the vector $OAE_k$. Each of the values in the vector $OAE_k$ may correspond to a particular time t. Enthalpy model generator 614 may access archetypal load profiles 608 and identify a particular archetypal load profile for the kth cluster of training data (i.e., the kth archetypal load profile). Enthalpy model generator 614 may use the time t of each of the values in vector $OAE_k$ as an input to the kth archetypal load profile to identify a corresponding archetypal load value $\hat{l}_{arc,k}(t)$. Enthalpy model generator 614 may populate the archetypal load vector $\hat{l}_{arc,k}$ with the identified archetypal load values. Enthalpy model generator 614 may use any of a variety of regression techniques to estimate values $\hat{\beta}_0^k$ and $\hat{\beta}_1^k$ for the enthalpy model coefficients (e.g., least squares regression, ordinary least squares regression, ridge regression, etc.).

Enthalpy model generator 614 may use the estimated values $\hat{\beta}_0^k$ and $\hat{\beta}_1^k$ as regression coefficients in the enthalpy model. The trained enthalpy model may have the form:

$$O\hat{A}E_k = \hat{\beta}_0^k + \hat{\beta}_1^k \hat{l}_{arc,k}$$

where $O\hat{A}E_k$ is the outside air enthalpy predicted by the enthalpy model, $\hat{l}_{arc,k}$ is a vector of archetypal load values provided as an input to the enthalpy model, and $\hat{\beta}_0^k$ and $\hat{\beta}_1^k$ are the trained regression coefficients of the enthalpy model. Although the variables in the enthalpy model are described as vectors or arrays including multiple data values, it is understood that the variables may be scalars (i.e., each variable having only a single data value) in various other implementations. As such, the enthalpy model may be used to predict an outside air enthalpy for any number of archetypal load values.

Still referring to FIG. 6, regression model generator 612 is shown to include a deterministic load model generator 616. Deterministic load model generator 616 may be configured to generate a deterministic load model that predicts the deterministic load value $\hat{l}_{det,k}(t)$ as a function of the archetypal load value $\hat{l}_{arc,k}(t)$, the estimated outside air enthalpy $O\hat{A}E_k(t)$ predicted by the enthalpy model, and the actual outside air enthalpy $OAE_k(t)$ based on measured or forecasted weather data. For example, deterministic load model generator 616 may generate a deterministic load model of the form:

$$l_k = \alpha_0^k + \alpha_1^k \hat{l}_{arc,k} + \alpha_2^k (OAE_k - O\hat{A}E_k) + e$$

where $\alpha_0^k$, $\alpha_1^k$, and $\alpha_2^k$ are deterministic load model coefficients for the kth cluster of training data ($k=1 \ldots n_{bins} \times n_{day\text{-}types}$), $l_k$ is a vector of historical load values for the kth cluster of training data, $e$ is a vector of the deterministic load model error, and the vectors $OAE_k$, $\hat{l}_{arc,k}$, and $O\hat{A}E_k$ are the same as previously described with respect to the enthalpy model. The quantity $(OAE_k - O\hat{A}E_k)$ represents a vector of enthalpy residuals (i.e., differences between the historical enthalpy values and the enthalpy values predicted by the enthalpy model based on the archetypal load data).

Deterministic load model generator 616 may use weather history data 676, corresponding archetypal load data, and corresponding load history data 674 to train the deterministic load model and determine values for the deterministic load model coefficients $\alpha_0^k$, $\alpha_1^k$ and $\alpha_2^k$. For example, deterministic load model generator 616 may use load history data 674 to populate the vector $l_k$. Deterministic load model generator 616 may subtract the vector $O\hat{A}E_k$ calculated by the enthalpy model from the actual enthalpy values $OAE_k$ to determine the enthalpy residuals. Each of the enthalpy values and load values in the deterministic load model may correspond to a particular time t.

Deterministic load model generator 616 may access archetypal load profiles 608 and identify a particular archetypal load profile for the kth cluster of training data (i.e., the kth archetypal load profile). Deterministic model generator 616 may use the time t as an input to the kth archetypal load profile to identify a corresponding archetypal load value $\hat{l}_{arc,k}(t)$ for each enthalpy/load pair. Deterministic model generator 616 may populate the archetypal load vector $\hat{l}_{arc,k}$ with the identified archetypal load values. Deterministic model generator 616 may use any of a variety of regression techniques to estimate values $\hat{\alpha}_0^k$, $\hat{\alpha}_1^k$, and $\hat{\alpha}_2^k$ for the deterministic load model coefficients (e.g., least squares regression, ordinary least squares regression, ridge regression, etc.).

Deterministic load model generator 616 may use the estimated values $\hat{\alpha}_0^k$, $\hat{\alpha}_1^k$, and $\hat{\alpha}_2^k$ as regression coefficients in the deterministic load model. The trained deterministic load model may have the form:

$$\hat{l}_{det,k} = \hat{\alpha}_0^k + \hat{\alpha}_1^k \hat{l}_{arc,k} + \hat{\alpha}_2^k (OAE_k - O\hat{A}E_k)$$

where $\hat{l}_{det,k}$ is the deterministic load value predicted by the deterministic load model, $\hat{\alpha}_0^k$, $\hat{\alpha}_1^k$, and $\hat{\alpha}_2^k$ are the trained regression coefficients of the deterministic load model, and the vectors $OAE_k$, $\hat{l}_{arc,k}$, and $O\hat{A}E_k$ are the same as previously described with respect to the enthalpy model. Although the variables in the deterministic load model are described as vectors or arrays including multiple data values, it is understood that the variables may be scalars (i.e., each variable having only a single data value) in various other implementations. As such, the deterministic load model may be used to predict a deterministic load value for any number of archetypal load values and/or enthalpy residuals.

Once the regression models 618 and the archetypal load profiles 608 have been generated, each of the clusters of training data may be characterized by a set of regression coefficients (i.e., $\hat{\alpha}_0^k$, $\hat{\alpha}_1^k$, $\hat{\alpha}_2^k$, $\hat{\beta}_0^k$, and $\hat{\beta}_1^k$) and a spline defining the archetypal load profile for the set. The regression model coefficients and the spline may be used online when generating the deterministic portion of the load forecast. In various embodiments, any of a variety of weather-related variables (e.g., cooling degree days, heating degree days, outside air temperature, outside air humidity, etc.) may be used in the regression models. These weather-related variables may supplement or replace outside air enthalpy in the regression models.

Still referring to FIG. 6, load/rate predictor 514 is shown to include a residual calculator 622. Residual calculator 622 may receive the deterministic load value $\hat{l}_{det}(t)$ predicted by the regression models 618 and an actual measured load l(t) 678. The actual measured load l(t) may be received as feedback from building subsystems 428 and may be the actual value predicted by the deterministic load value $\hat{l}_{det}(t)$. Residual calculator 622 may be configured to calculate a residual based on the deterministic load value $\hat{l}_{det}(t)$ and the actual measured load l(t). In some embodiments, the residual is the difference between the actual measured load l(t) and the deterministic load value $\hat{l}_{det}(t)$, as shown in the following equation:

$$r(t) = l(t) - \hat{l}_{det}(t)$$

where r(t) is the value of the residual at time t. Residual calculator 622 may calculate a residual $r_k(t)$ for each of the $n_{bins} \times n_{day-types}$ clusters at each time step t, where k=1 . . . $n_{bins} \times n_{day-types}$. The residuals $r_k(t)$ for a cluster k for time steps t=1 . . . n may be used to form a vector $r_k$ of residuals for the cluster k, as shown in the following equation:

$$r_k = \begin{bmatrix} r_k(1) \\ r_k(2) \\ \vdots \\ r_k(n) \end{bmatrix}$$

The residual vectors $r_k$ may be provided to autoregressive model generator 624 for use in generating an autoregressive model, described in greater detail below.

Still referring to FIG. 6, load/rate predictor 514 is shown to include an autoregressive (AR) model generator 624. AR model generator 624 may be configured to generate an AR model that predicts the stochastic portion $\hat{l}_{sto}(t)$ of the forecasted load. The AR model generated by AR model generator 624 may represent a time series and may have the following form:

$$r(t) + a_1 r(t-1) + a_2 r(t-2) + \ldots + a_p r(t-p) = v(t)$$

where r(t) is the value of the time series at time t, $a_1$, $a_2$, . . . , $a_p$ are the AR parameters, and v(t) is noise.

The AR model may predict a current value of the time series (i.e., a current residual) based on the past values of the time series (i.e., past residuals). The AR model may also iteratively predict the value of the time series over a horizon of length h into the future as follows:

$$\hat{r}(n+j) = -\sum_{i=1}^{p} \hat{a}_i r(n+j-i) \forall \; j = 1 \ldots h$$

where $\hat{a}_i$ are estimates of the AR parameters $a_i$.

AR model generator 624 may determine values for the estimated parameters $\hat{a}_i$ based on a history of residuals provided by residual calculator 622 (e.g., using a regression technique). In other words, previous residuals provided by residual calculator 622 may be used as training data to estimate the parameters $\hat{a}_i$. Once the AR parameters $\hat{a}_i$ are trained, the AR model can be used to predict the residual $\hat{r}(t)$ at time t as follows:

$$\hat{r}(t) = -\sum_{i=1}^{p} \hat{a}_i r(t-i)$$

where the variables r(t−i) are previous values of the time series (i.e., past residuals) calculated by residual calculator 622. The residual r(t) may constitute the stochastic portion $\hat{l}_{sto}(t)$ of the forecasted load.

In some embodiments, AR model generator 624 generates an unsorted vector $r_{unsorted}$ which combines the residual vectors $r_k$ for each of the $n_{bins} \times n_{day-types}$ clusters, as shown in the following equation:

$$r_{unsorted} = \begin{bmatrix} r_1 \\ \vdots \\ r_{n_{bins} \times n_{day-types}} \end{bmatrix}$$

where each of the rows in the vector $r_{unsorted}$ is a column vector containing the residuals for one of the $n_{bins} \times n_{day-types}$ clusters. AR model generator 624 may sort the vector $r_{unsorted}$ (e.g., in chronological order) and use the sorted vector as training data for estimating the AR parameters $\hat{a}_i$. In some embodiments, AR model generator 624 generates a single AR model 626 that is trained using the residual data from each of the $n_{bins} \times n_{day-types}$ clusters.

In some embodiments, AR model generator 624 determines or selects an order of the AR model. The order of the model may determine how many past values of the time series are used. In some embodiments, AR model generator 624 uses Akaike's information criterion to determine the order of the AR model. In other embodiments, AR model generator 624 uses statistical hypothesis testing to determine the order of the AR model. An exemplary technique for determining a model parameter order, which may be used by AR model generator 624, is described in detail in U.S. patent application Ser. No. 14/133,310 titled "Systems and Methods for Determining an Appropriate Model Parameter Order" filed Dec. 18, 2013. In some embodiments, AR model generator 624 selects a first order AR model.

Still referring to FIG. 6, load/rate predictor 514 is shown to include a load adjuster 630. Load adjusted 630 may receive the deterministic load value $\hat{l}_{det}(t)$ provided by regression models 618 and the stochastic load value $\hat{l}_{sto}(t)$ provided by AR model 626. Load adjuster 630 may be configured to determine the forecasted load $\hat{l}(t)$ as a function of the deterministic load value $\hat{l}_{det}(t)$ and the stochastic load value $\hat{l}_{sto}(t)$. In some embodiments, load adjuster 630 determines the forecasted load $\hat{l}(t)$ by adding the stochastic load value $\hat{l}_{sto}(t)$ to the deterministic load value $\hat{l}_{det}(t)$, as shown in the following equation:

$$\hat{l}(t) = \hat{l}_{det}(t) + \hat{l}_{sto}(t)$$

As explained above, the deterministic load value $\hat{l}_{det}(t)$ may be a function of the time-of-day t, the day-type, and a current or forecasted weather parameter (e.g., outside air enthalpy). The stochastic load value $\hat{l}_{sto}(t)$ may be based on a residual error between the deterministic load value $\hat{l}_{det}(t)$ and the actual measured load value $l(t)$, and may be updated as new load measurements are received. Advantageously, the stochastic load value $\hat{l}_{sto}(t)$ predicts an error of the deterministic model and allows load/rate predictor 514 to adjust the deterministic load value $\hat{l}_{det}(t)$ to account for the predicted error, thereby increasing the accuracy of the adjusted load forecast $\hat{l}(t)$.

Load/rate predictor 514 may be used offline to determine the regression coefficients $\hat{\alpha}_0^k, \hat{\alpha}_1^k, \hat{\alpha}_2^k, \hat{\beta}_0^k,$ and $\hat{\beta}_1^k$ for each of regression models 618 and an optimal spline for each of archetypal load profiles 608 based on clusters of historical training data. The regression parameters and the spline may be determined for each of the $n_{bins} \times n_{day-types}$ clusters of training data. Load/rate predictor 514 may also determine the AR model coefficients $\hat{a}_i$ for AR model 626. In some embodiments, a single AR model 626 is generated that applies to all of the clusters. Load/rate predictor 514 may then be used online to forecast load values.

Still referring to FIG. 6, load/rate predictor 514 is shown to include a load profile selector 628. Load profile selector 628 may be configured to receive and handle load forecast requests. Load forecast requests may be received from other components of BMS 400 or external data sources. For example, load forecast requests may be received from demand response optimizer 516. Demand response optimizer 516 may use the load forecasts to determine an optimal set of control actions for building subsystems 428, as described with reference to FIG. 5. In various embodiments, load forecast requests may be received from a client device 448, remote systems or applications 444, and/or any other system, device, or entity that may be interested in a forecasted load.

Load profile selector 628 may be configured to select one or more of archetypal load profiles 608 for use in determining the forecasted load. In some embodiments, load profile selector 628 selects the one or more archetypal load profiles 608 based on a time parameter t included in the request. For example, the load forecast request may request the forecasted load for a particular time t in the future. Load profile selector 628 may invoke binning module 602 and/or day-type classifier 604 to classify the requested time t as belonging to a particular day-type and/or a particular bin. For example, if the forecasted load is an electricity consumption load requested for a time on a Wednesday, load profile selector 628 may identify and select the archetypal load profile 608 that applies to electrical consumption loads on Wednesdays (e.g., based on the binning parameters and/or day-type classifications). Load profile selector 628 may also identify an one or more sets of regression models 618 for use in determining the deterministic load value $\hat{l}_{de_t}(t)$.

In some embodiments, load profile selector 628 selects the archetypal load profile(s) 608 and the set(s) of regression models 618 for each of a plurality of time steps for which the forecasted load is requested. For example, the forecasted load may be requested for each time step t within a prediction window of duration h (e.g., in order for demand response optimizer 516 to determine optimal control decisions throughout the prediction window). Load profile selector 628 may select an archetypal load profile 608 and a set of regression models 618 for each time t, where t=1 . . . h. Load/rate predictor 514 may use the selected archetypal load profile(s) 608 to determine an archetypal load value $\hat{l}_{arc}(t)$ for each of the identified time steps t=1 . . . h.

Load/rate predictor 514 may invoke weather service 504 to determine a weather forecast for each of the identified time steps t=1 . . . h. The weather forecast may be provided by the NOAA and may include a forecasted OAT and/or OAH. Load/rate predictor 514 may use enthalpy calculator 610 to determine a forecasted OAE value OAE(t) for each time step, based on the forecasted OAT and OAH values.

For each time step t within the prediction window, load/rate predictor 514 may use the determined archetypal load value $\hat{l}_{arc}(t)$ as an input to the selected enthalpy model to estimate the enthalpy value OÂE(t), as shown in the following equation:

$$O\hat{A}E(t)=\hat{\beta}_0+\hat{\beta}_1 \hat{l}_{arc}(t)$$

where the parameters $\hat{\beta}_0$ and $\hat{\beta}_1$ have known values determined by enthalpy model generator 614 based on the historical training data.

Load/rate predictor 514 may use the estimated enthalpy value OÂE(t) from the enthalpy model and the forecasted OAE value OAE(t) from weather service 504 as inputs to the selected deterministic load model to estimate the deterministic load value $\hat{l}_{det}(t)$, as shown in the following equation:

$$\hat{l}_{det}(t)=\hat{\alpha}_0+\hat{\alpha}_1 \hat{l}_{arc}(t)+\hat{\alpha}_2(OAE(t)-O\hat{A}E(t))$$

where the parameters $\hat{\alpha}_0$, $\hat{\alpha}_1$, and $\hat{\alpha}_2$ have known values determined by deterministic load model generator 616 based on the historical training data.

Load/rate predictor 514 may receive a current measured load $l(0)$ (i.e., at time t=0) as a feedback signal and use residual calculator 622 to determine a current residual $r(0)$. The current residual $r(0)$ may represent the difference between the current measured load $l(0)$ and the current deterministic load value $\hat{l}_{det}(0)$, as shown in the following equation:

$$r(0)=l(0)-\hat{l}_{det}(0)$$

where $\hat{l}_{det}(0)$ is the estimated deterministic load value for the time corresponding to the measured load $l(0)$ (i.e., at time t=0). Load/rate predictor 514 may use the current residual $r(0)$ in conjunction with a series of past residuals to predict a future residual. Load/rate predictor 514 may use the future residual as the stochastic load value $\hat{l}_{sto}(t)$.

Load/rate predictor 514 may use load adjuster 630 to calculate the predicted load value $\hat{l}(t)$ by adding the stochastic load value $\hat{l}_{sto}(t)$ to the deterministic load value $\hat{l}_{det}(t)$, as shown in the following equation:

$$\hat{l}(t)=\hat{l}_{det}(t)+\hat{l}_{sto}(t)$$

Figure 7:
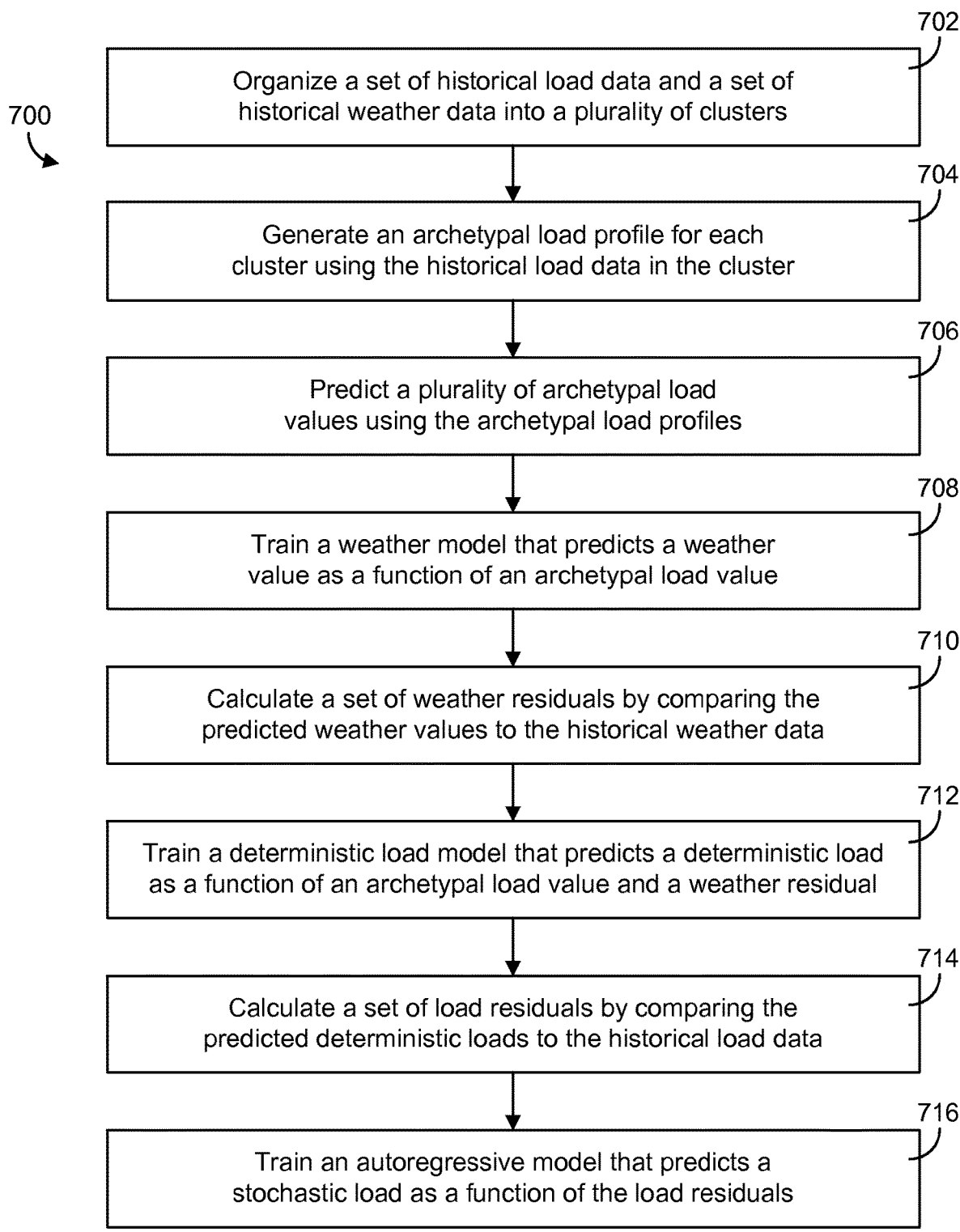
FIG. 7 is a flowchart of a process for generating a load forecasting model, which may be performed by the load/rate predictor of FIG. 5, according to an exemplary embodiment.

Referring now to FIG. 7, a flowchart of a process 700 for generating a load forecasting model is shown, according to an exemplary embodiment. In some embodiments, process 700 is performed by load/rate predictor 514 as described with reference to FIGS. 5-6. Process 700 is shown to include organizing a set of historical load data and a set of historical weather data into a plurality of clusters (step 702). In some embodiments, step 702 is performed by binning module 602 and/or day-type classifier 604, as described with reference to FIG. 6. Step 702 may include dividing the historical data into a plurality of bins according to binning parameters associated with the data. Step 702 may further include dividing the historical data within each bin into a plurality of day-type clusters based on which of the days represented in the historical data have similar load profiles.

Process 700 is shown to include generating an archetypal load profile for each cluster using the historical load data in the cluster (step 704). In some embodiments, step 704 is performed by archetypal load profile generator 606, as described with reference to FIG. 6. Step 704 may include generating a load profile (e.g., a spline, a piecewise-defined polynomial, etc.) that represents the typical or average load behavior of the days within the cluster. Step 704 may include finding an optimal set of data points that optimize an objective function based on the error between the optimal data points and the individual load profiles in the cluster. The archetypal load profile may be a spline that connects the optimal set of data points.

Still referring to FIG. 7, process 700 is shown to include predicting a plurality of archetypal load values using the archetypal load profiles (step 706). Each archetypal load profile identify a relationship between a particular time-of-day t and an archetypal load value $\hat{l}_{arc}(t)$. The time-of-day t may be provided as an input to the archetypal load profiles to determine an archetypal load value $\hat{l}_{arc}(t)$ at various times-of-day.

Process 700 is shown to include training a weather model that predicts a weather value as a function of an archetypal load value (step 708). In some embodiments, step 708 is performed by enthalpy model generator 614, as described with reference to FIG. 6. For example, the weather model may be an enthalpy model that predicts an outside air enthalpy $O\hat{A}E$ as a function of an archetypal load value $\hat{l}_{det}(t)$, as shown in the following equation:

$$O\hat{A}E(t) = \hat{\beta}_0 + \hat{\beta}_1 \hat{l}_{arc}(t)$$

In various other embodiments, the weather model may predict any other weather value (e.g., temperature, humidity, etc.) as a function of an archetypal load value $\hat{l}_{arc}(t)$. Step 708 may include using the historical weather data (e.g., OAE(t)) and a set of predicted archetypal load values $\hat{l}_{arc}(t)$ corresponding to the historical weather data to train the regression parameters $\hat{\beta}_0$ and $\hat{\beta}_1$ (e.g., using a regression technique). An archetypal load value $\hat{l}_{arc}(t)$ may correspond to a historical weather value OAE(t) if both values are for the same time step t.

Still referring to FIG. 7, process 700 is shown to include calculating a set of weather residuals by comparing the predicted weather values to the historical weather data (step 710). The historical weather data may include actual measured values (e.g., OAT, OAH, etc.) or values calculated from actual measured values (e.g., OAE). In some embodiments, the residuals are differences between the weather values $O\hat{A}E(t)$ predicted by the weather model and the historical weather values OAE(t). For example, each weather residual may be calculated by subtracting the predicted weather value $O\hat{A}E(t)$ from the corresponding historical weather value OAE(t).

Process 700 is shown to include training a deterministic load model that predicts a deterministic load as a function of an archetypal load value and a weather residual (step 712). In some embodiments, step 712 is performed by deterministic load model generator 616, as described with reference to FIG. 6. For example, the deterministic load model may have the following form:

$$\hat{l}_{det}(t) = \hat{\alpha}_0 + \hat{\alpha}_1 \hat{l}_{arc}(t) + \hat{\alpha}_2(OAE(t) - O\hat{A}E(t))$$

where the quantity $(OAE(t) - O\hat{A}E(t))$ represents the weather residual calculated in step 710. Step 712 may include using the historical load data to populate $\hat{l}_{det}(t)$, using the historical weather data to populate OAE(t), using the output of the weather model to populate $O\hat{A}E(t)$, and using the archetypal load profile to populate $\hat{l}_{arc}(t)$. The regression parameters $\hat{\alpha}_0$, $\hat{\alpha}_1$, and $\hat{\alpha}_2$ may be trained (e.g., using a regression technique) based on the populated values for the variables in the deterministic load model.

Still referring to FIG. 7, process 700 is shown to include calculating a set of load residuals by comparing the predicted deterministic loads to the historical load data (step 714). In some embodiments, step 714 is performed by residual calculator 622, as described with reference to FIG. 6. The historical load data l(t) may include actual measured load values and may be received as feedback from building subsystems 428. In some embodiments, the residuals are differences between the predicted deterministic load values $\hat{l}_{det}(t)$ and the historical load values l(t). For example, each load residual r(t) may be calculated by subtracting the predicted deterministic load value $\hat{l}_{det}(t)$ from the historical load value l(t), as shown in the following equation:

$$r(t) = l(t) - \hat{l}_{det}(t)$$

Process 700 is shown to include training an autoregressive (AR) model that predicts a stochastic load as a function of the load residuals (step 716). In some embodiments, step 716 is performed by AR model generator 624, as described with reference to FIG. 6. The AR model may predict a current value of a time series (i.e., a current residual) based on the past values of the time series (i.e., past residuals). The AR model may also iteratively predict the value of the time series over a horizon of length h into the future as follows:

$$\hat{r}(n+j) = -\sum_{i=1}^{p} \hat{a}_i r(n+j-i) \forall j = 1 \ldots h$$

where $\hat{a}_i$ are estimates of the AR parameters $a_i$. Step 716 may include training values for the estimated parameters $\hat{a}_i$ based on a history of the load residuals calculated in step 714 (e.g., using a regression technique).

Figure 8:
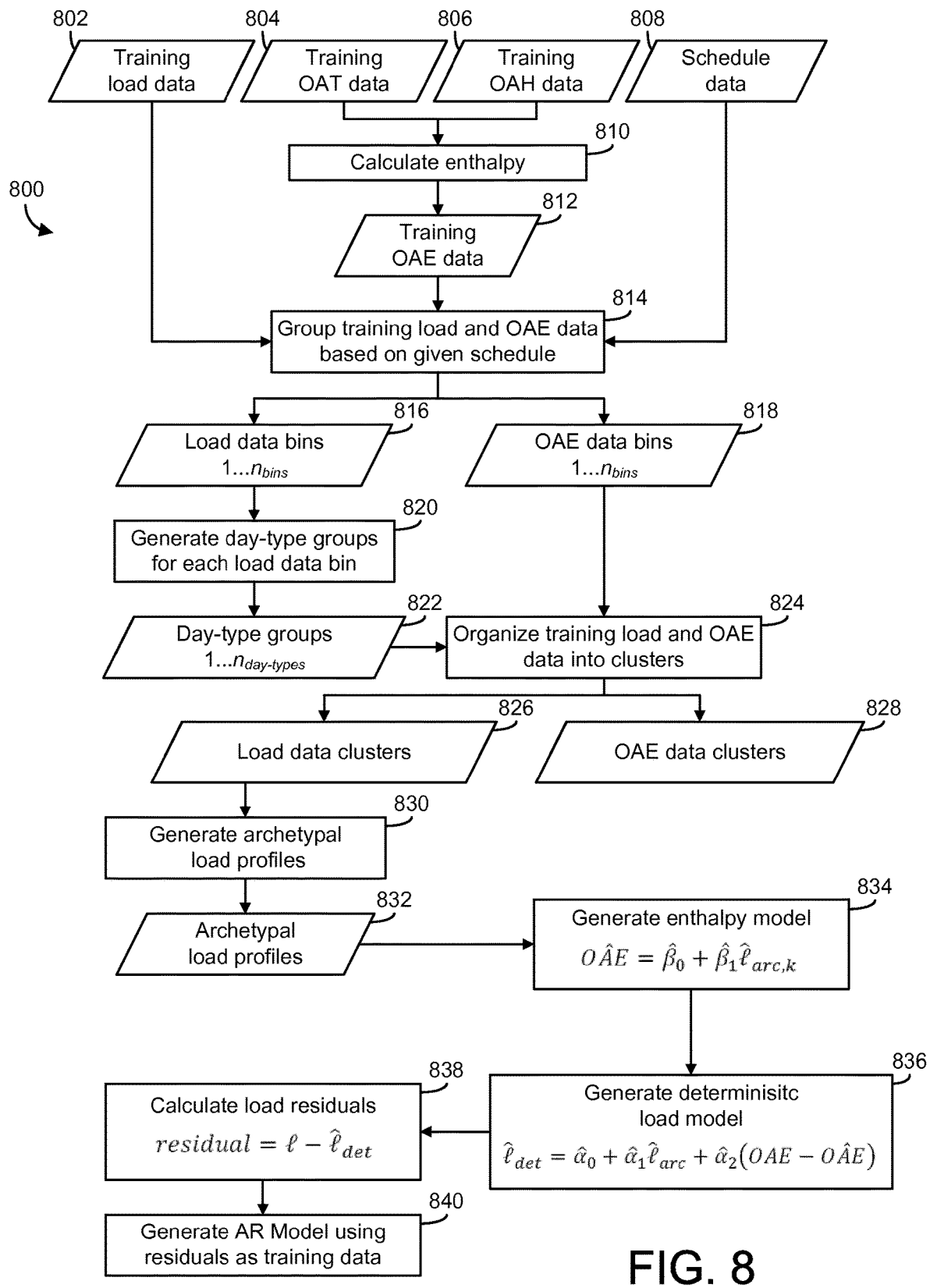
FIG. 8 is a flowchart of more detailed process for generating a load forecasting model, which may be performed by the load/rate predictor of FIG. 5, according to an exemplary embodiment.

Referring now to FIG. 8, a flowchart of another process 800 for generating a load forecasting model is shown, according to an exemplary embodiment. Process 800 is a more detailed version of process 700. In some embodiments, process 800 is performed by load/rate predictor 514, as described with reference to FIGS. 5-6. Process 800 is shown to include using training outside air temperature (OAT) data 804 and training outside air humidity (OAH) data 806 to calculate enthalpy (step 810), which generates a set of training outside air enthalpy (OAE) data 812. Training data 804-806 may be historical weather data and may be received from a weather service and/or retrieved from a weather history database.

Process 800 is shown to include grouping training load data 802 and OAE data 812 based on a given schedule (step 814). Training load data 802 may be historical load data for a particular facility and may be retrieved from a load history database. The given schedule may be defined by schedule data 808, which may be retrieved from a schedule database. In some embodiments, step 814 includes organizing the training load data 802 and OAE data 812 into a plurality of bins based on one or more binning parameters associated with the data. The grouping in step 814 may result in a set of load data bins 816 (1 ... $n_{bins}$) and a set of OAE data bins 818 (1 ... $n_{bins}$), where $n_{bins}$ is the total number of bins.

Still referring to FIG. 8, process 800 is shown to include generating day-type groups for each load data bin (step 820). Step 820 may include dividing the load data in each of the $n_{bins}$ load data bins 816 into a set of day-type groups 822 (1 ... $n_{day-types}$), where $n_{day-types}$ is the total number of day-type groups. Process 800 is shown to include organizing the training load data and OAE data into clusters (step 824). Each cluster may be a unique combination of one of the $n_{bins}$ bins and one of the $n_{day-types}$ day-types. Accordingly, step 824 may produce a set of $n_{bins} \times n_{day\text{-}types}$ load data clusters 826 and a set of $n_{bins} \times n_{day\text{-}types}$ OAE data clusters 828.

Process 800 is shown to include generating archetypal load profiles (step 830). Step 830 may be performed for each of the $n_{bins} \times n_{day\text{-}types}$ load data clusters and may produce an archetypal load profile 832 for each of the $n_{bins} \times n_{day\text{-}types}$ load data clusters. Step 830 may include generating a load profile (e.g., a spline, a piecewise-defined polynomial, etc.) that represents the typical or average load behavior of the days within the cluster. Step 830 may include finding an optimal set of data points that optimize an objective function based on the error between the optimal data points and the individual load profiles in the cluster. The archetypal load profile may be a spline that connects the optimal set of data points.

Still referring to FIG. 8, process 800 is shown to include generating an enthalpy model (step 834). The enthalpy model may predict an outside air enthalpy OÂE as a function of an archetypal load value $\hat{l}_{arc}$, as shown in the following equation:

$$O\hat{A}E = \hat{\beta}_0 + \hat{\beta}_1 \hat{l}_{arc,k}$$

Step 834 may include using the historical enthalpy data calculated in step 810 (e.g., OAE) and a set of archetypal load values $\hat{l}_{arc}$ predicted by archetypal load profiles 832 to train the regression parameters $\hat{\beta}_0$ and $\hat{\beta}_1$ (e.g., using a regression technique).

Process 800 is shown to include generating a deterministic load model (step 836). The deterministic load model may predict a deterministic load value $\hat{l}_{det}$ as a function of an archetypal load value $\hat{l}_{arc}$ and an enthalpy residual (OAE−OÂE) as shown in the following equation:

$$\hat{l}_{det} = \hat{\alpha}_0 + \hat{\alpha}_1 \hat{l}_{arc} + \hat{\alpha}_2 (OAE - O\hat{A}E)$$

The enthalpy residual (OAE−OÂE) may be calculated by subtracting the OÂE predicted in step 834 from the actual OAE calculated in step 810. The archetypal load value $\hat{l}_{arc}$ may be provided by archetypal load profiles 832. The regression parameters $\hat{\alpha}_0$, $\hat{\alpha}_1$, and $\hat{\alpha}_2$ may be trained (e.g., using a regression technique) by substituting the training load data l 802 for the variable $\hat{l}_{det}$ in the preceding equation and using the archetypal load values predicted by archetypal load provides 832 for the variable $\hat{l}_{arc}$.

Still referring to FIG. 8, process 800 is shown to include calculating load residuals (step 838). Step 838 may include comparing the deterministic loads predicted by the deterministic load model to training load data 802. The training load data l may include actual measured load values and may be received as feedback from building subsystems 428. In some embodiments, the residuals are differences between the predicted deterministic load values $\hat{l}_{det}$ and the training load values l. For example, each load residual residual may be calculated by subtracting the predicted deterministic load value $\hat{l}_{det}$ from the historical load value l, as shown in the following equation:

$$\text{residual} = l - \hat{l}_{det}$$

Process 800 is shown to include training an autoregressive (AR) using the residuals as training data (step 840). The AR model may predict a current value of a time series (i.e., a current residual) based on the past values of the time series (i.e., past residuals). The AR model may also iteratively predict the value of the time series over a horizon of length h into the future as follows:

$$\hat{r}(n+j) = -\sum_{i=1}^{p} \hat{a}_i r(n+j-i) \forall j = 1 \ldots h$$

where $\hat{a}_i$ are estimates of the AR parameters $a_i$. Step 840 may include training values for the estimated parameters $\hat{a}_i$ based on a history of the load residuals calculated in step 838 (e.g., using a regression technique).

Figure 9:
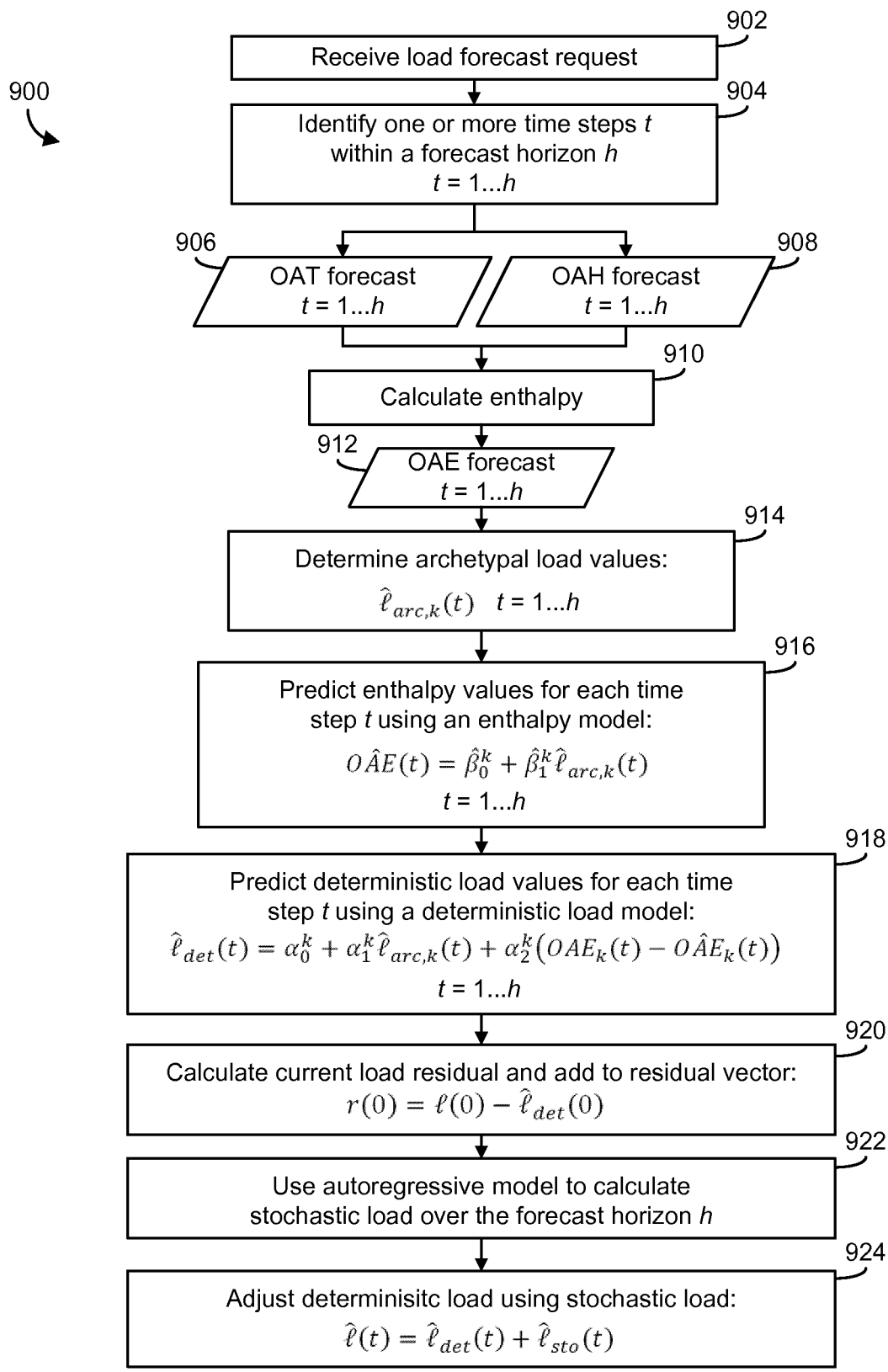
FIG. 9 is a flowchart of a process for forecasting loads using a load forecasting model, which may be performed by the load/rate predictor of FIG. 5, according to an exemplary embodiment.

Referring now to FIG. 9, a flowchart of a process 900 for forecasting loads using a load forecasting model is shown, according to an exemplary embodiment. In some embodiments, process 900 is performed by load/rate predictor 514, as described with reference to FIGS. 5-6. Process 900 is shown to include receiving a load forecast request (step 902) and identifying one or more time steps t within a forecast horizon h (step 904). The forecast request may identify individual time steps t for which the load forecast is requested, a range of time steps t, and/or the forecast horizon h. For each of the identified time steps t, an outside air temperature (OAT) forecast 906 and an outside air humidity (OAH) forecast 908 may be obtained (e.g., from a weather service).

Process 900 is shown to include calculating an outside air enthalpy (OAE) based on the forecasted OAT values 906 and the forecasted OAH values 908 (step 910). An OAE may be calculated for each of the time steps t identified in step 904. The calculated OAE values may be forecasted OAE values defining OAE forecast 912.

Still referring to FIG. 9, process 900 is shown to include determining archetypal load values $\hat{l}_{arc,k}(t)$ for each time step t (step 914). The archetypal load values may be determined using one or more archetypal load profiles corresponding to the time steps t. The archetypal load values $\hat{l}_{arc,k}(t)$ may be used as inputs to an enthalpy model to predict enthalpy values OÂE(t) for each of the time steps t (step 916). In some embodiments, the enthalpy model has the following form:

$$O\hat{A}E(t) = \hat{\beta}_0^k + \hat{\beta}_1^k \hat{l}_{arc,k}(t)$$

where OÂE(t) is the predicted outside air enthalpy, $\hat{l}_{arc,k}(t)$ is the archetypal load value determined in step 914, and the parameters $\hat{\beta}_0^k$ and $\hat{\beta}_1^k$ are estimated regression parameters determined using a regression technique.

Process 900 is shown to include predicting deterministic load values for each time step t using a deterministic load model (step 918). The deterministic load model may have the following form:

$$\hat{l}_{det}(t) = \hat{\alpha}_0^k + \hat{\alpha}_1^k \hat{l}_{arc,k}(t) + \hat{\alpha}_2^k (OAE_k(t) - O\hat{A}E_k(t))$$

where $\hat{l}_{det}(t)$ is the deterministic load value, $OAE_k(t)$ is the OAE forecast determined in step 912, and $O\hat{A}E_k(t)$ is the enthalpy value predicted by the enthalpy model in step 916. The parameters $\alpha_0^k$, $\hat{\alpha}_1^k$, and $\hat{\alpha}_2^k$ may be regression parameters determined using a regression technique.

Still referring to FIG. 9, process 900 is shown to include calculating a current load residual and adding the current load residual to a residual vector (step 920). The current load residual may be a difference between the actual (e.g., measured) current load value l(0) and the deterministic load value $\hat{l}_{det}(0)$ predicted by the deterministic load model. In some embodiments, step 920 includes calculating the current load residual by subtracting the deterministic load value $\hat{l}_{det}(0)$ from the current load value l(0) as shown in the following equation:

$$r(0) = l(0) - \hat{l}_{det}(0)$$

Process 900 is shown to include using an autoregressive (AR) model to calculate the stochastic load $\hat{l}_{sto}(t)$ over the forecast horizon h (step 922). The AR model may predict a current value of a time series (i.e., a current residual) based on the past values of the time series (i.e., past residuals). The AR model may also iteratively predict the value of the time series over a horizon of length h into the future as follows:

$$\hat{r}(n+j) = -\sum_{i=1}^{p} \hat{a}_i r(n+j-i) \forall\ j = 1 \ldots h$$

where $\hat{a}_i$ are estimates of the AR parameters $\hat{a}_i$. The residuals predicted by the AR model may constitute the stochastic load $\hat{l}_{sto}(t)$.

Still referring to FIG. 9, process 900 is shown to include adjusting the deterministic load using the stochastic load (step 924). In some embodiments, step 924 includes adding stochastic load $\hat{l}_{sto}(t)$ to the deterministic load $\hat{l}_{det}(t)$ as shown in the following equation:

$$\hat{l}(t) = \hat{l}_{det}(t) + \hat{l}_{sto}(t)$$

where the sum of the stochastic load $\hat{l}_{sto}(t)$ and the deterministic load $\hat{l}_{det}(t)$ is the forecasted load $\hat{l}(t)$. In some embodiments, the forecasted load $\hat{l}(t)$ is used to determine an optimal set of control actions for controllable devices that operate to serve the forecasted load (e.g., devices of building subsystems 428).

Referring now to FIG. 10, an exemplary load profile 1000 for a facility is shown, according to an exemplary embodiment. Load profile 1000 is shown as an electricity consumption curve over several weeks for a facility (e.g., an office building) that has different daily load profiles on weekdays and weekends. The daily load profile for a facility can vary significantly from one day of the week to another. For example, load profile 1000 indicates that the electricity consumption of the facility is higher on Monday-Friday (i.e., when workers are present) and lower on Saturday-Sunday (i.e., when workers are not present). As described with reference to FIG. 6, day-type classifier 604 may be configured to analyze the load profile for a facility and automatically determine an appropriate day-type classification. For the exemplary load profile 1000 shown in FIG. 10, day-type classifier 604 may classify Monday-Friday as a first day-type, and Saturday-Sunday as a second day-type.

In some embodiments, day-type classifier 604 uses a pattern recognition technique to statistically determine which days have similar load profiles. For example, day-type classifier 604 may analyze load profile 1000 to identify daily features of the load data. Daily features may include, for example, the average daily load and the peak daily load over a predetermined time period. Day-type classifier 604 may create seven data clusters, where each cluster corresponds to a particular day of the week. Univariate and/or multivariate outlier identification procedures may be applied to each cluster to remove any abnormal or unusual feature vectors. Day-type classifier 604 may use a clustering analysis to identify days of the weeks with similar load profiles.

Figure 11:
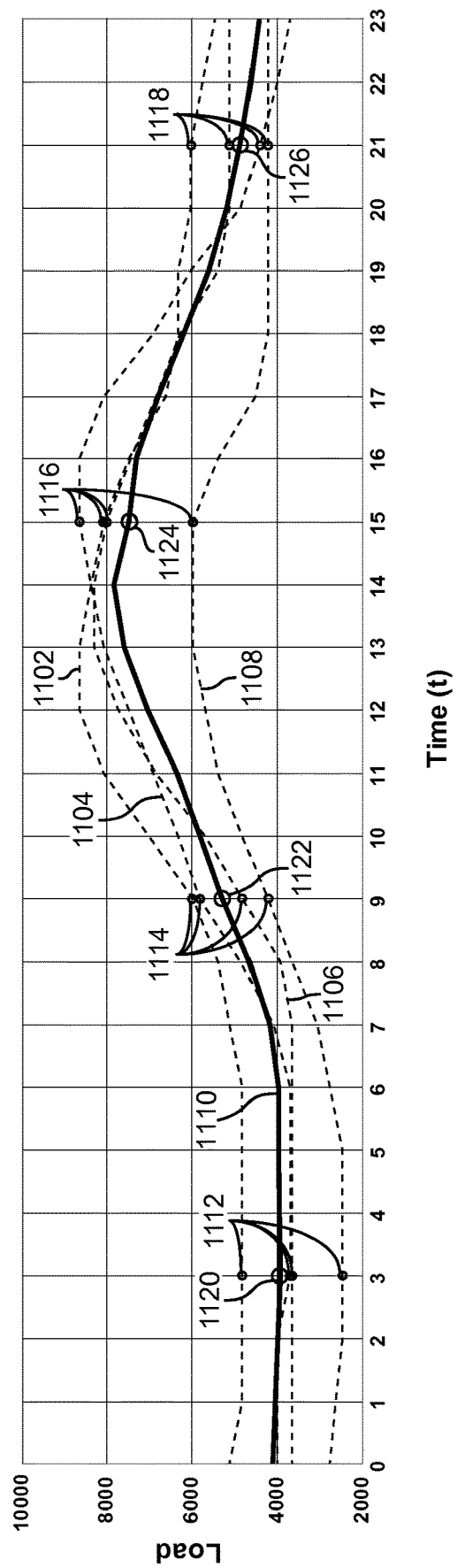
FIG. 11 is a graph of a collection of daily load profiles for days within the same day-type group and an archetypal load profile that represents the collection of daily load profiles, according to an exemplary embodiment.

Referring now to FIG. 11, a graph 1100 of several daily load profiles 1102-1108 is shown, according to an exemplary embodiment. Load profiles 1102-1108 represent the daily load profiles of individual days within the same day-type group. Each of load profiles 1102-1108 indicates load (e.g., electricity consumption) as a function of time t throughout the corresponding day. Since the days corresponding to load profiles 1102-1108 are in the same day-type group, load profiles 1102-1108 may have similar load characteristics.

Load profile 1110 is an archetypal load profile for the day-type group. As described with reference to FIG. 6, an archetypal load profile for a day-type group may be a typical or representative load profile for the days within the day-type group. For example, an archetypal load profile for electricity consumption may indicate the typical electricity consumption of a facility throughout the day (e.g., as a function of time) and may take into account time-of-day t. Advantageously, archetypal load profiles 1110 captures the effect of the time-of-day t on the forecasted load and may be used by load/rate predictor 514 to determine an archetypal load value $l_{arc}(t)$ for a facility based on the time-of-day t.

Archetypal load profile 1110 may be generated based on the individual daily load profiles 1102-1108. In some embodiments, archetypal load profile generator 606 generates archetypal load profile 1110 by determining a curve that best represents or best fits the collection of individual daily load profiles 1102-1108. For example, archetypal load profile generator 606 may generate a spline (e.g., a piecewise-defined function of polynomials) that serves as the archetypal load profile 1110 for the cluster of individual daily load profiles 1102-1108. The spline may be defined by the points 1120, 1122, 1124, and 1126 at which these polynomials connect. By predetermining the times of day for the connection points (e.g., every hour, every three hours, etc.), an optimal load value for each connection point 1120-1126 can be found using an optimization technique. For example, archetypal load profile generator 606 may optimize (e.g., minimize) the following objective function to determine optimal load values for the connection points 1120-1126:

$$J = \min_{y_s}\left(\sum_{i=1}^{m}(y_i - \hat{y})^T(y_i - \hat{y})\right)$$

where $y_i$ and $\hat{y}$ are vectors of actual and estimated load values, respectively, for the ith full day in a cluster of training data (e.g., hourly load values), m is the total number of full days in the cluster of training data (i.e., four in FIG. 11), and $y_s$ is a vector of connection points along load profiles 1102-1108 (e.g., points 1112, 1114, 1116, and 1118).

The optimization process performed by archetypal load profile generator 606 may determine optimal values for the connection points $y_s$. For example, archetypal load profile generator 606 may initialize $y_s$ with a certain value and calculate the vector of estimated load values $\hat{y}$ for each full day (as described with reference to FIG. 6). The vector of estimated load values $\hat{y}$ may be subtracted from the vector of actual load values $y_i$ for each of the days in the cluster of training data and the objective function J may be calculated as shown in the preceding equation. This process may be repeated iteratively until the optimal values of $y_s$ are found. The optimal values for $y_s$ are the points 1120-1126 that define the estimated archetypal load profile 1110. In other words, optimizing the objective function J determines values for the vector of connection points $y_s$ 1120-1126. Archetypal load profile generator 606 may generate a spline (e.g., a piecewise-defined function of polynomials) that connects points 1120-1126 and serves as archetypal load profile 1110.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system (BMS) configured to generate predictive models used to forecast values of a building variable monitored by the BMS, the BMS comprising:
   a deterministic model generator configured to use historical BMS data comprising historical values of the building variable to train one or more deterministic models that predict deterministic values of the building variable, wherein a forecasted weather value is used as an input to the one or more deterministic models to calculate the deterministic values of the building variable;
   a stochastic model generator configured to use differences between actual values of the building variable and the deterministic values of the building variable predicted by the one or more deterministic models to train a stochastic model that predicts stochastic values of the building variable;
   a forecast adjuster configured to generate adjusted forecasts of the building variable by combining the deterministic values of the building variable predicted by the one or more deterministic models and the stochastic values of the building variable predicted by the stochastic model;
   a demand response optimizer configured to use the adjusted forecasts of the building variable to generate a set of control actions for building equipment; and
   the building equipment comprising at least one of a chiller, a heater, a boiler, a pump, a valve, an air handling unit, a variable air volume unit, an actuator, a damper, or a fan, the building equipment configured to operate in accordance with the set of control actions to affect a variable state or condition monitored by the BMS.

2. The building management system of claim 1, wherein the building variable represents a load, an energy consumption, a utility rate, or a photovoltaic energy generation.

3. The building management system of claim 1, further comprising a binning module configured to organize the historical BMS data into a plurality of bins according to a binning parameter associated with the historical BMS data;
   wherein the deterministic model generator trains one or more deterministic models for each of the plurality of bins.

4. The building management system of claim 1, further comprising a day-type classifier configured to:
   identify one or more days represented by the historical BMS data that have similar time-variant profiles with respect to a particular time series feature; and
   organize the historical BMS data into a plurality of day-type groups such that the historical BMS data corresponding to the days with similar time-variant profiles are organized into the same day-type group.

5. The building management system of claim 4, further comprising an archetypal profile generator configured to generate an archetypal time-variant profile for a plurality of days within the same day-type group with respect to a particular time series value based on the historical BMS data.

6. The building management system of claim 1, wherein the deterministic model generator is a regression model generator configured to generate one or more regression models that predict the deterministic values of the building variable;
   wherein the regression model generator uses the historical BMS data to train regression coefficients of the one or more regression models.

7. The building management system of claim 6, wherein the regression model generator comprises a deterministic load model generator configured to generate a deterministic load regression model that predicts a deterministic load as a function of an archetypal load value.

8. The building management system of claim 1, wherein the stochastic model generator is an autoregressive (AR) model generator configured to generate an AR model that predicts a difference between the deterministic values of the building variable predicted by the one or more deterministic models and the actual values of the building variable.

9. The building management system of claim 8, wherein the AR model generator trains the AR model using a history of differences between the deterministic values of the building variable and the actual values of the building variable for a time series.

10. The building management system of claim 1, wherein combining the deterministic values of the building variable and the stochastic values of the building variable comprises adding each deterministic value to a corresponding stochastic value.

11. The building management system of claim 1, wherein:
the building variable is a load;
a deterministic value of the building variable is a deterministic load value; and
a stochastic value of the building variable is a stochastic load value.

12. A forecasting system configured to forecast a time series of values of a building variable in a building management system (BMS), the forecasting system comprising:
a load/rate predictor configured to:
use one or more deterministic models trained with historical BMS data to predict a deterministic value of the building variable, wherein the load/rate predictor uses a forecasted weather value as an input to the one or more deterministic models to calculate the deterministic value of the building variable;
use a stochastic model trained with differences between actual values of the building variable for the time series and deterministic values of the building variable output by the one or more deterministic models to predict a stochastic value of the building variable;
generate an adjusted forecast of the building variable by combining the deterministic value of the building variable predicted by the one or more deterministic models and the stochastic value of the building variable predicted by the stochastic model;
a demand response optimizer configured to use the adjusted forecast of the building variable to generate a set of control actions for building equipment; and
the building equipment comprising at least one of a chiller, a heater, a boiler, a pump, a valve, an air handling unit, a variable air volume unit, an actuator, a damper, or a fan, the building equipment configured to operate in accordance with the set of control actions to affect a variable state or condition monitored by the BMS.

13. The forecasting system of claim 12, wherein the one or more deterministic models comprise:
a first regression model that predicts the deterministic value of the building variable as a function of at least two correlated predictor variables that are correlated with one another; and
a second regression model that predicts one of the correlated predictor variables as a function of another of the correlated predictor variables;
wherein the load/rate predictor uses the second regression model to eliminate a correlation between the correlated predictor variables in the first regression model.

14. The forecasting system of claim 12, wherein the building variable comprises one of a load value, an energy consumption value, a utility rate value, or a photovoltaic energy generation value.

15. The forecasting system of claim 12, wherein the load/rate predictor is configured to use an archetypal profile for a particular time series feature to determine an archetypal value for the time series based on a time-of-day.

16. The forecasting system of claim 15, wherein the load/rate predictor uses the archetypal value for the time series as an input to the one or more deterministic models to calculate the deterministic value of the building variable.

17. A method for operating a building management system (BMS), the method comprising:
using one or more regression models trained with historical BMS data to forecast a deterministic value of a building variable for a time series, wherein forecasting the deterministic value of the building variable comprises using a forecasted weather value as an input to the one or more regression models to calculate the deterministic value of the building variable;
using a history of residuals for the time series to forecast a residual value of the building variable, wherein the residuals are differences between forecasted deterministic values of the building variable for the time series and actual values of the building variable for the time series;
combining the deterministic value of the building variable and the residual value of the building variable to generate an adjusted forecast of the building variable;
using the adjusted forecast to generate a set of control actions for building equipment comprising at least one of a chiller, a heater, a boiler, a pump, a valve, an air handling unit, a variable air volume unit, an actuator, a damper, or a fan; and
operating the building equipment in accordance with the set of control actions to affect a variable state or condition monitored by the BMS.

18. The method of claim 17, wherein the building variable represents a load, an energy consumption, a utility rate, or a photovoltaic energy generation.

19. The method of claim 17, wherein a residual of the building variable is forecasted using an autoregressive (AR) model;
the method further comprising periodically updating coefficients of the one or more regression models and coefficients of the AR model.

* * * * *